United States Patent [19]
Ogura et al.

[11] Patent Number: 6,023,071
[45] Date of Patent: *Feb. 8, 2000

[54] IMAGE READING APPARATUS

[75] Inventors: Nobuhiko Ogura; Tohru Tsuchiya; Seishi Ikami; Taizo Akimoto, all of Kanagawa-Ken, Japan

[73] Assignee: Fuji Photo Film Co., Ltd., Kanagawa-Ken, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/877,889

[22] Filed: Jun. 18, 1997

[30] Foreign Application Priority Data

Jun. 18, 1996 [JP] Japan ..................................... 8-155910
Jun. 18, 1996 [JP] Japan ..................................... 8-155912

[51] Int. Cl.⁷ .................................................... G03B 42/00
[52] U.S. Cl. ........................ 250/586; 250/585; 250/458.1
[58] Field of Search .................................... 250/586, 585, 250/591, 584, 458.1, 459.1, 234, 235, 236, 559.06

[56] References Cited

U.S. PATENT DOCUMENTS

| | | |
|---|---|---|
| 4,655,590 | 4/1987 | Asgano et al. .......................... 250/585 |
| 5,083,023 | 1/1992 | Miyagawa . |
| 5,307,148 | 4/1994 | Kambara et al. . |
| 5,418,371 | 5/1995 | Aslund et al. ........................ 250/458.1 |
| 5,427,910 | 6/1995 | Kamentsky et al. . |
| 5,502,465 | 3/1996 | Agano . |
| 5,528,050 | 6/1996 | Miller et al. ............................ 250/586 |

FOREIGN PATENT DOCUMENTS

| | | |
|---|---|---|
| 0666487 | 8/1995 | European Pat. Off. . |
| 55-12429 | 1/1980 | Japan . |
| 55-116340 | 9/1980 | Japan . |
| 55-163472 | 12/1980 | Japan . |
| 56-11395 | 2/1981 | Japan . |
| 56-104645 | 8/1981 | Japan . |
| 59-15843 | 1/1984 | Japan . |
| 61-51738 | 3/1986 | Japan . |
| 61-93538 | 5/1986 | Japan . |
| 1-60782 | 12/1989 | Japan . |
| 1-60784 | 12/1989 | Japan . |
| 3-266825 | 11/1991 | Japan ..................................... 250/585 |
| 4-3952 | 1/1992 | Japan . |
| 5-45332 | 2/1993 | Japan . |
| WO9201966A | 2/1992 | WIPO . |
| WO96/24042 | 8/1996 | WIPO . |

*Primary Examiner*—Constantine Hannaher
*Attorney, Agent, or Firm*—Sughrue, Mion, Zinn, Macpeak & Seas, PLLC

[57] ABSTRACT

An image reading apparatus includes a first laser stimulating ray source for emitting a laser beam having a wavelength of 633 nm or 635 nm, a second laser stimulating ray source for emitting a laser beam having a wavelength of 470 to 480 nm, a laser beam scanning device for scanning the laser beam, at least one light detector for photoelectrically detecting light released from an image carrier carrying an image, and at least one filter member disposed in front of the light detector and having a plurality of filters for transmitting light of different wavelengths. The thus constituted image reading apparatus can be used for a radiation diagnosis system, an autoradiographic system, an electron microscope detecting system and a radiation diffraction image detecting system using a stimulable phosphor and a fluorescence detecting system and an image can be read with high sensitivity.

16 Claims, 9 Drawing Sheets

IMAGE READING APPARATUS

BACKGROUND OF THE INVENTION

The present invention relates to an image reading apparatus and, particularly, to such an apparatus which can read an image with high sensitivity and is adapted for use in a fluorescence detecting system.

DESCRIPTION OF THE PRIOR ART

There is known a radiation diagnosis system comprising the steps of employing, as a detecting material for the radiation, a stimulable phosphor which can absorb and store the energy of radiation upon being irradiated therewith and release a stimulated emission whose amount is proportional to that of the received radiation upon being stimulated with an electromagnetic wave having a specific wavelength range, storing and recording the energy of radiation transmitted through an object in the stimulable phosphor contained in a stimulable phosphor layer formed on a stimulable phosphor sheet, scanning the stimulable phosphor layer with an electromagnetic wave to excite the stimulable phosphor, photoelectrically detecting the stimulated emission released from the stimulable phosphor to produce digital image signals, effecting image processing on the obtained digital image signals, and reproducing an image on displaying means such as a CRT or the like or a photographic film (see for example, Japanese Patent Application Laid Open Nos. 55-12429, 55-116340, 55-163472, 56-11395, 56-104645 and the like).

There is also known an autoradiography system comprising the steps of employing a similar stimulable phosphor as a detecting material for the radiation, introducing a radioactively labeled substance into an organism, using the organism or a part of the tissue of the organism as a specimen, placing the specimen and a stimulable phosphor sheet formed with a stimulable phosphor layer together in layers for a certain period of time, storing and recording radiation energy in a stimulable phosphor contained in the stimulable phosphor layer, scanning the stimulable phosphor layer with an electromagnetic wave to excite the stimulable phosphor, photoelectrically detecting the stimulated emission released from the stimulable phosphor to produce digital image signals, effecting image processing on the obtained digital image signals, and reproducing an image on displaying means such as a CRT or the like or a photographic film (see for example, Japanese Patent Publication No. 1-60784, Japanese Patent Publication No. 1-60782, Japanese Patent Publication No. 4-3952 and the like).

There are further known an electron microscope detecting system and a radiographic diffraction image detecting system comprising the steps of employing, as a detecting material for an electron beam or radiation, a stimulable phosphor which can absorb and store the energy of an electron beam or radiation upon being irradiated therewith and release a stimulated emission whose amount is proportional to that of the received electron beam or radiation upon being stimulated with an electromagnetic wave having a specific wavelength range, irradiating a metal or nonmetal specimen with an electron beam and effecting elemental analysis, composition analysis or structural analysis of the specimen by detecting a diffraction image or a transmission image, or irradiating the tissue of an organism with an electron beam and detecting an image of the tissue of the organism, or irradiating a specimen with radiation, detecting a radiographic diffraction image and effecting structural analysis of the specimen (see for example, Japanese Patent Application Laid Open No. 61-51738, Japanese Patent Application Laid Open No. 61-93538, Japanese Patent Application Laid Open No. 59-15843 and the like).

Unlike the system using a photographic film, according to these systems using the stimulable phosphor as a detecting material for an image, development which is chemical processing, becomes unnecessary. Further, it is possible reproduce a desired image by effecting image processing on the obtained image data and effect quantitative analysis using a computer. Use of a stimulable phosphor in these processes is therefore advantageous.

On the other hand, a fluorescence system using a fluorescent substance as a labeling substance instead of a radioactively labeled substance in the autoradiography system is known. According to this system, it is possible to study a genetic sequence, the expression level of a gene and the metabolism, absorption, excretion path and state of a substance introduced into a test mouse and to effect the separation or identification of protein or the estimation of the molecular weight or properties of protein or the like. For example, this system can perform a process including the steps of distributing a plurality of DNA fragments on a gel support by means of electrophoresis after a fluorescent dye was added to a solution containing a plurality of DNA fragments to be distributed or distributing a plurality of DNA fragments on a gel support containing fluorescent dye or dipping a gel support on which a plurality of DNA fragments have been distributed by means of electrophoresis in a solution containing fluorescent dye, thereby labeling the electrophoresis-distributed DNA fragments, exciting the fluorescent dye by a stimulating ray to cause it to release a fluorescent light, detecting the released fluorescent light to produce an image and detecting the distribution of the DNA on the gel support. This system also performs a process including the steps of distributing a plurality of DNA fragments on a gel support by means of electrophoresis, denaturing the DNA, transferring at least a part of the denatured DNA fragments onto a transfer support such as a nitrocellulose support by the Southern-blotting method, hybridizing a probe prepared by labeling target DNA and DNA or RNA complementary thereto with the denatured DNA fragments, thereby selectively labeling only the DNA fragments complementary to the probe DNA or probe RNA, exciting the fluorescent dye by a stimulating ray to cause it to release a fluorescent light, detecting the released fluorescent light to produce an image and detecting the distribution of the target DNA on the transfer support. This system can further perform a process including the steps of preparing a DNA probe complementary to DNA containing a target gene labeled by a labeling substance, hybridizing it with DNA on a transfer support, combining an enzyme with the complementary DNA labeled by a labeling substance, causing the enzyme to contact a fluorescent substrate, transforming the fluorescent substrate to a fluorescent substance having a property to release fluorescent light, exciting the thus produced fluorescent substance by a stimulating ray to release fluorescent light, detecting the fluorescent light to produce an image and detecting the distribution of the target DNA on the transfer support. This fluorescence detecting system is advantageous in that a genetic sequence or the like can be easily detected without using a radioactive substance.

Therefore, there has been proposed an image reading apparatus which can be used in a fluorescence detecting system and is provided with an argon laser stimulating ray source for emitting a laser beam having a wavelength of 488 nm.

However, the radiation diagnosis system, the autoradiographic system, the electron microscope detecting system and the radiation diffraction image detecting system using a stimulable phosphor as the image detecting material and the fluorescence detecting system all scan image carrier such as a stimulable phosphor sheet, a gel support, a transfer support or the like with a stimulating ray and produce an image by detecting light emitted from the image carrier to effect diagnosis or detection. It is therefore advantageous and preferable to constitute an image reading apparatus so as to be usable for any of these systems.

Therefore, an image reading apparatus has been proposed, which is provided with a solid laser stimulating ray source for emitting a laser beam having a wavelength of 635 nm capable of exciting a stimulable phosphor BaFX (X representing a halogen.) for making it usable in the autoradiography systems and an LED for emitting light having a wavelength of 450 nm capable of exciting fluorescent substances used in a fluorescence detecting system for making it usable in the fluorescence detecting system.

However, since most fluorescent substances used for producing fluorescent images in the fluorescence detecting system are designed to be efficiently excited by an argon laser having a wavelength of 488 nm, they are not efficiently excited by light having a wavelength of 450 nm and it is hard to generate a sufficient amount of fluorescent light. Further, in this image reading apparatus, the solid laser stimulating ray source and the LED are built in an optical head and the image carrier is scanned with a stimulating ray by moving the optical head at high speed in both main and sub directions. Therefore, if an attempt is made to use a laser stimulating ray source as a stimulating ray source instead of the LED for increasing the strength of the stimulating ray and improving the detection sensitivity, it becomes extremely difficult to build the laser stimulating ray source in the optical head. Use of an LED is therefore unavoidable as the stimulating ray source. As a result, the strength of the stimulating ray is low and the amount of released fluorescent light is also low, thereby degrading the detection sensitivity.

SUMMARY OF THE INVENTION

It is therefore an object of the present invention to provide an image reading apparatus which can be used for a radiation diagnosis system, an autoradiographic system, an electron microscope detecting system and a radiation diffraction image detecting system using a stimulable phosphor and a fluorescence detecting system and can read an image with high sensitivity.

The above and other objects of the present invention can be accomplished by an image reading apparatus comprising a first laser stimulating ray source for emitting a laser beam having a wavelength of 633 nm or 635 nm, a second laser stimulating ray source for emitting a laser beam having a wavelength of 470 to 480 nm, laser beam scanning means for scanning the laser beam, at least one light detecting means for photoelectrically detecting light released from an image carrier carrying an image, and at least one filter means disposed in front of the light detecting means and having a plurality of filters for transmitting light of different wavelengths.

The above and other objects of the present invention can be also accomplished by an image reading apparatus comprising a first laser stimulating ray source for emitting a laser beam having a wavelength of 633 nm or 635 nm, a second laser stimulating ray source for emitting a laser beam having a wavelength of 470 to 480 nm, laser beam scanning means for scanning the laser beam, a plurality of light detecting means for photoelectrically detecting light released from an image carrier carrying an image, and filter means disposed in front of each of the light detecting means, each being adapted for selectively transmitting only light of a predetermined wavelength range.

In a preferred aspect of the present invention, the image carrier to be scanned with the laser beam emitted from the first laser stimulating ray source is constituted by a carrier carrying an image of fluorescent substances or stimulable phosphor sheet containing a stimulable phosphor recording an image selected from the group consisting of a radiation image, an autoradiographic image, a radiographic diffraction image and electron microscope image of an object and the image carrier to be scanned with the laser beam emitted from the second laser stimulating ray source is constituted by a carrier carrying an image of fluorescent substances.

In a further preferred aspect of the present invention, the image reading apparatus further comprises a third laser stimulating ray source for emitting a laser beam having a wavelength of 530 to 540 nm.

In a further preferred aspect of the present invention, the image carrier to be scanned with the laser beam emitted from the third laser stimulating ray source is constituted by a carrier carrying an image of fluorescent substances.

In a further preferred aspect of the present invention, the image data are produced using a stimulable phosphor sheet.

In a further preferred aspect of the present invention, the image reading apparatus further comprises control means capable of selectively switching the plurality of laser stimulating ray sources and the plurality of filters of the filter means.

In a further preferred aspect of the present invention, the control means is constituted so as to be able to selectively switch the plurality of laser stimulating ray sources and the plurality of filters of the filter means in accordance with kinds of the image carriers.

In a further preferred aspect of the present invention, the image reading apparatus further comprises control means capable of selectively switching the plurality of laser stimulating ray sources.

In a further preferred aspect of the present invention, the control means is constituted so as to be able to selectively switch the plurality of laser stimulating ray sources in accordance with kinds of the image carriers.

In a further preferred aspect of the present invention, the control means is constituted so as to be able to selectively switch the plurality of laser stimulating ray sources every scanning line of the image carrier carrying an image.

In a further preferred aspect of the present invention, the control means is constituted so as to be able to selectively switch the plurality of laser stimulating ray sources every pixel or pixel unit consisting of two or more pixels of the image carrier carrying an image.

In a further preferred aspect of the present invention, the control means is constituted so as to be able to sequentially switch the plurality of laser stimulating ray sources every scanning line of the image carrier carrying an image.

As termed with respect to the present invention, the phrase "the image carrier carries an image of fluorescent substances" includes the case where the image carrier carries an image of a specimen labeled by a labeling substance and the case where the image carrier carries an image of fluorescent substances obtained by combining an enzyme with a specimen labeled by a labeling substance, causing the enzyme to contact a fluorescent substrate and transforming the fluorescent substrate to a fluorescent substance.

In the present invention, the fluorescent substance employed for labeling a specimen to form an image to be carried in an image carrier and read by stimulating it using a laser beam having a wavelength of from 470 nm to 480 nm may be of any type insofar as it can be stimulated by a laser beam having a wavelength of from 470 nm to 480 nm. However, preferably employed fluorescent substances stimulable by a laser beam having a wavelength of from 470 nm to 480 nm include Fluorescein (C.I. No. 45350), Fluorescein-X indicated by the structural formula (1) shown below, YOYO-1 indicated by the structural formula (2), TOTO-1 indicated by the structural formula (3), YOPRO-1 indicated by the structural formula (4), Cy-3 (registered trademark) indicated by the structural formula (5), Nile Red indicated by the structural formula (6), BCECF indicated by the structural formula (7), Rhodamine 6G (C.I. No. 45160), Acridine Orange (C.I. No. 46005), SYBR Green ($C_2H_6OS$), Quantum Red, R-Phycoerrythrin, Red 613, Red 670, Fluor X, FAM, AttoPhos, Bodipy phosphatidylcholine, SNAFL, Calcium Green, Fura Red, Fluo 3, AllPro, NBD phosphoethanolamine and the like. In the present invention, the fluorescent substance employed for labeling a specimen to form an image to be carried in an image carrier and read by stimulating it using a laser beam having a wavelength of from 633 nm or 635 nm may be of any type insofar as it can be stimulated by a laser beam having a wavelength of from 633 nm or 635 nm. However, preferably employed fluorescent substances stimulable by a laser beam having a wavelength of from 633 nm or 635 nm include Cy-5 (registered trademark) indicated by the structural formula (8), Allphycocyanin and the like. Moreover, in the present invention, the fluorescent substance employed for labeling a specimen to form an image to be carried in an image carrier and read by stimulating it using a laser beam having a wavelength of from 530 nm to 540 nm may be of any type insofar as it can be stimulated by a laser beam having a wavelength of from 530 nm to 540 nm. However, preferably employed fluorescent substances stimulable by a laser beam having a wavelength of from 530 nm to 540 nm include Cy-3 (registered trademark) indicated by the structural formula (5), Rhodamine 6G (C.I. No. 45160), Rhodamine B (C.I. No. 45170), Ethidium Bromide indicated by the structural formula (9), Texas Red indicated by the structural formula (10), Propidium Iodide indicated by the structural formula (11), POPO-3 indicated by the structural formula (12), Red 613, Red 670, Carboxyrhodamine (R6G), R-Phycoerythrin, Quantum Red, JOE, HEX, Ethidium homodimer, Lissamine rhodamine B peptide and the like.

(1)

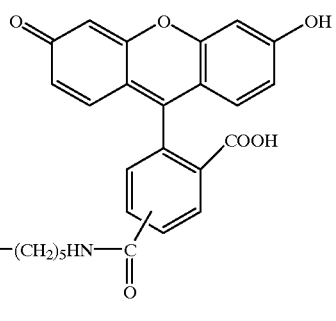

Fluorescein-X (2)

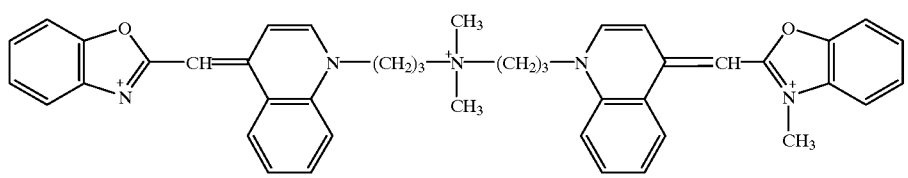

YOYO-1

(3)

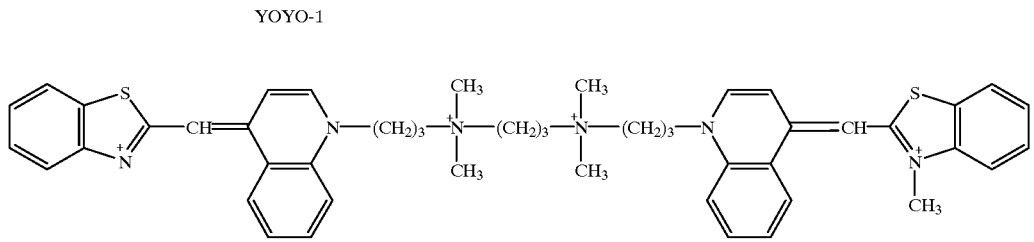

TOTO-1

-continued
(4)
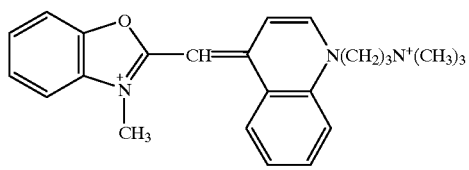
YO-PRO-1
(5)
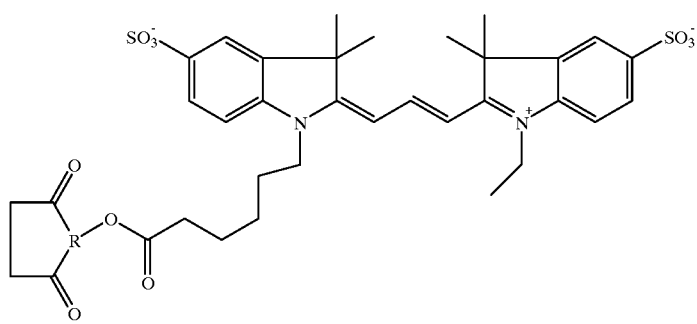
Cy-3
(6)
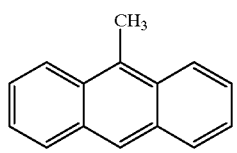
Nile Red
(7)
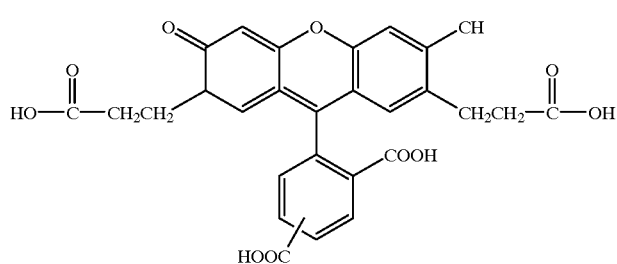
BCECF
(8)
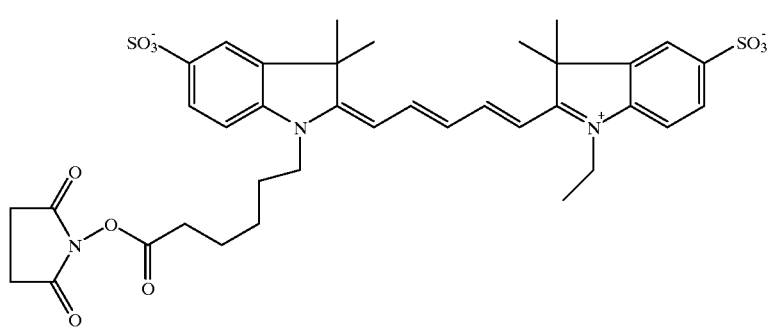
Cy-5

(9)

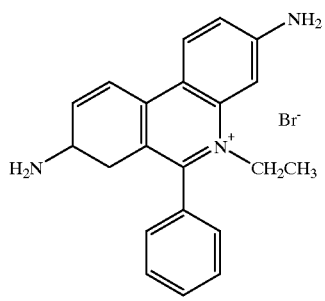

Ethidium Bromide (10)

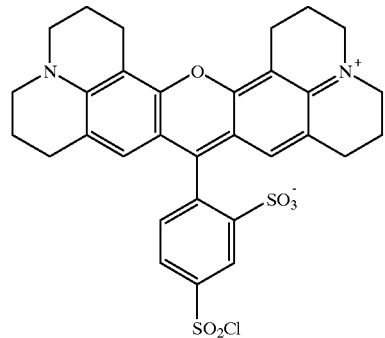

Texas-Red (11)

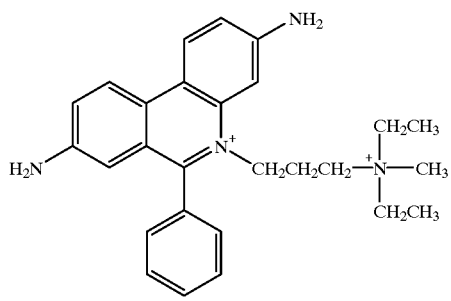

Propidium Iodide (12)

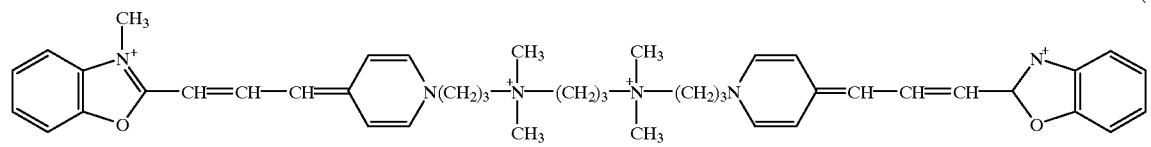

POPO-3

In the present invention, the stimulable phosphor employed for producing a radiation image, an autoradiographic image, a radiographic diffraction image and an electron microscopic image of an object may be of any type insofar as it can store radiation energy or electron beam energy and can be stimulated by an electromagnetic wave to release the radiation energy or electron beam energy stored therein in the form of light. However, a stimulable phosphor which can be stimulated by light having a visible light wavelength is preferably employed. More specifically, preferably employed stimulable phosphors include alkaline earth metal fluorohalide phosphors $(Ba_{1-x}, M^{2+}_x)F\ X{:}yA$ (where $M^{2+}$ is at least one alkaline earth metal selected from the group consisting of Mg, Ca, Sr, Zn and Cd; X is at least one halogen selected from the group consisting of Cl, Br and I, A is at least one element selected from the group consisting of Eu, Tb, Ce, Tm, Dy, Pr, He, Nd, Yb and Er; x is equal to or greater than 0 and equal to or less than 0.6 and y is equal to or greater than 0 and equal to or less than 0.2) disclosed in U.S. Pat. No. 4,239,968, alkaline earth metal fluorohalide phosphors SrFX:Z (where X is at least one halogen selected from the group consisting of Cl, Br and I; and Z is at least one of Eu and Ce) disclosed in Japanese Patent Application Laid Open No. 2-276997, europium activated complex halide phosphors BaFX xNaX':aEu$^{2+}$ (where each of X and X' is at least one halogen selected from the group consisting of Cl, Br and I; x is greater than 0 and equal to or less than 2; and y is greater than 0 and equal to or less than 0.2) disclosed in Japanese Patent Application Laid Open No. 59-56479, cerium activated trivalent metal oxyhalide phosphors MOX:xCe (where M is at least one trivalent metal selected from the group consisting of Pr, Nd, Pm, Sm, Eu, Tb, Dy, Ho, Er, Tm, Yb and Bi; X is at least one halogen selected from the group consisting of Br and I; and x is greater than 0 and less than 0.1) disclosed in Japanese Patent Application Laid Open No. 58-69281, cerium activated rare earth oxyhalide phosphors LnOX:xCe (where Ln is at least one rare earth element selected from the group consisting of Y, La, Gd and Lu; X is at least one halogen selected from the group consisting of Cl, Br, and I; and x is greater than 0 and equal to or less than 0.1) disclosed in U.S. Pat. No. 4,539,137 and europium activated complex halide phosphors M$^{II}$FX aM$^{I}$X' bM$^{\prime II}$X"$_2$ cM$^{III}$X'"$_3$ xA:yEu$^{2+}$ (where M$^{II}$ is at least one alkaline earth metal selected from the group consisting of Be, Sr and Ca; M$^{I}$ is at least one alkaline metal selected from the group consisting of Li, Na, K, Rb and Cs; M$^{\prime II}$ is at least one divalent metal selected from the group consisting of Be and Mg; M$^{III}$ is at least one trivalent metal selected from the group consisting of Al, Ga, In and Tl; A is at least one metal oxide; X is at least one halogen selected from the group consisting of Cl, Br and I; each of X', X" and X'" is at least one halogen selected from the group consisting of F, Cl, Br and I; a is equal to or greater than 0 and equal to or less than 2; b is equal to or greater than 0 and equal to or less than 10$^{-2}$; c is equal to or greater than 0 and equal to or less than 10$^{-2}$; a+b+c is equal to or greater than 10$^{-2}$; x is greater than 0 and equal to or less than 0.5; and y is greater than 0 and equal to or less than 0.2) disclosed in U.S. Pat. No. 4,962,047.

The above and other objects and features of the present invention will become apparent from the following description made with reference to the accompanying drawings.

DESCRIPTION OF THE PREFERRED EMBODIMENTS

Figure 1:
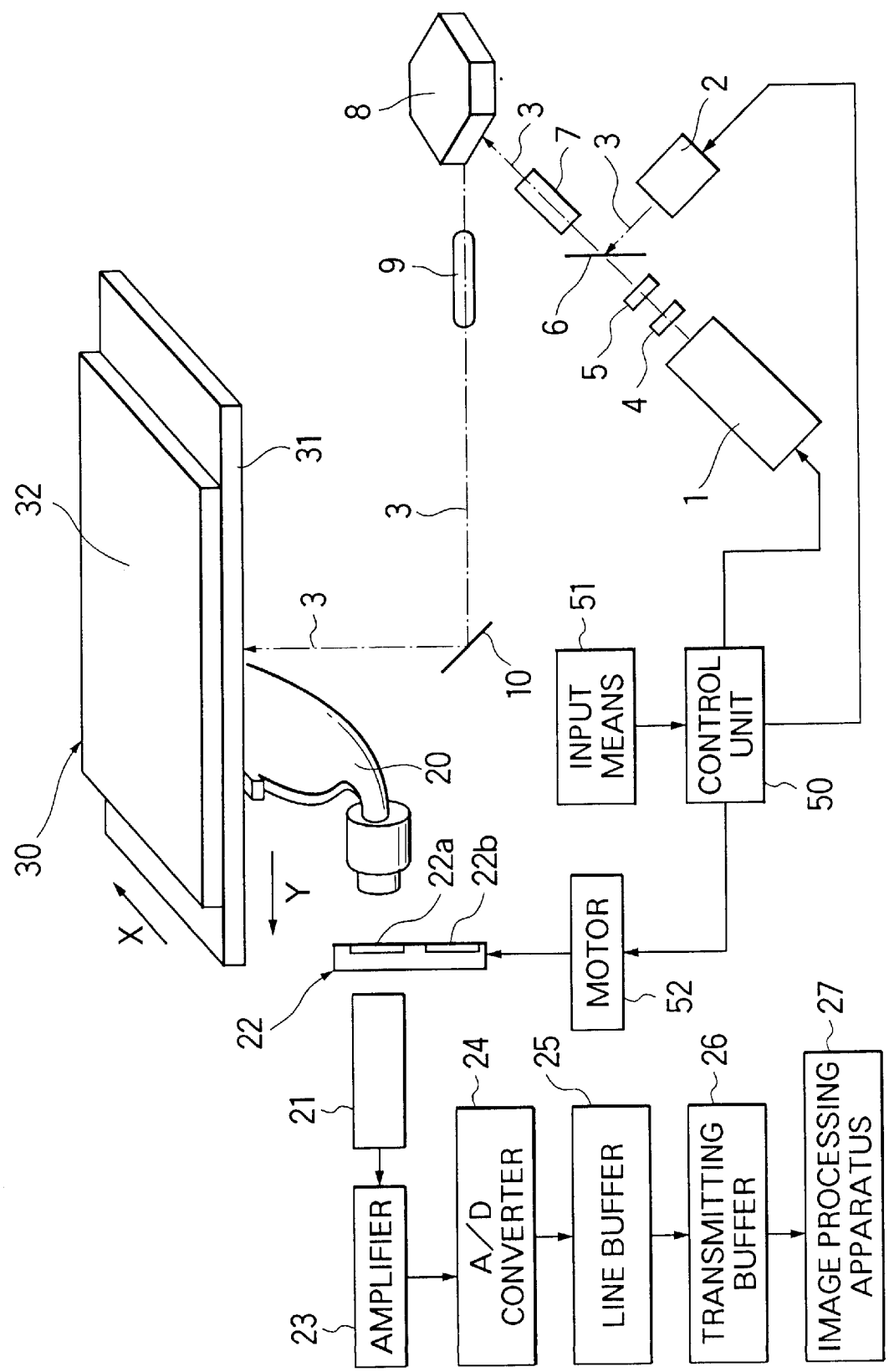
FIG. 1 is a schematic perspective view showing an image reading apparatus which is a preferred embodiment of the present invention.

As shown in FIG. 1, an image reading apparatus includes a first laser stimulating ray source 1 for emitting a laser beam having a wavelength of 633 nm and a second laser stimulating ray source 2 for emitting a laser beam having a wavelength of 473 nm. In this embodiment, the first laser stimulating ray source 1 is constituted by a He-Ne laser beam source and the second laser stimulating ray source 2 is constituted by a second harmonic generation element.

A laser beam 3 emitted from the first laser stimulating ray source 1 passes through a light modulator 4 when it is on and passes through a filter 5, thereby cutting light in a wavelength region corresponding to a wavelength region of stimulated emission emitted from the stimulable phosphor sheet in response to stimulation by the laser beam 3 having a wavelength of 633 nm. A dichroic mirror 6 is provided for transmitting light having a wavelength of 633 nm but reflecting light having a wavelength of 473 nm in an optical path of the laser beam 3 emitted from the first laser stimulating ray source 1 and the laser beam 3 emitted from the first laser stimulating source 1 and transmitted through the filter 5 passes through the dichroic mirror 6 and enters a beam expander 7. On the other hand, a laser beam 3 emitted from the second laser stimulating ray source 2 is reflected by the dichroic mirror 6 and impinges on the beam expander 7. The beam diameter of the laser beam 3 is accurately adjusted by the beam expander 7 and the laser beam 3 enters a polygon mirror 8. The laser beam 3 deflected by the polygon mirror 8 passes through an f θ lens 9 and is reflected by a reflecting mirror 10, thereby impinging upon a sheet-like fluorescent image carrier unit 30. The f θ lens 9 ensures that the fluorescent image carrier unit 30 is always scanned with the laser beam 3 at a uniform beam speed when it is scanned with the laser beam 3 in a direction indicated by X, namely, the main scanning direction.

The image reading apparatus according to this embodiment is constituted so as to be able to read out an image of fluorescent dye recorded in a transfer support, a gel support or the like, and a radiation image, an autoradiographic image, a radiographic diffraction image or an electron microscopic image of an object recorded in a stimulable phosphor layer formed on a stimulable phosphor sheet. In FIG. 1, the fluorescent image carrier unit 30 includes a glass plate 31 and a transfer support 32 placed on the glass plate 31 and in which an electrophoresis image of denatured DNA labeled with fluorescent dye is recorded.

The electrophoresis image of denatured DNA labeled with fluorescent dye is recorded in the transfer support 32, for example, in the following manner. First, a plurality of DNA fragments containing a specific gene are separated and distributed on a gel support medium by means of electrophoresis and are denatured by alkali processing to form single-stranded DNA. Then, according to the known Southern blotting method, the gel support and a transfer support 12 are stacked to transfer at least a part of the denatured DNA fragments onto the transfer support 12 and the transferred DNA fragments are fixed on the transfer support by heating and irradiating with an ultraviolet ray. Further, probes prepared by labeling DNA or RNA with fluorescent dye, which is complementary to the DNA containing the specific gene and the denatured DNA fragments on the transfer support 12 are hybridized by heating to form double-stranded DNA fragments or combined DNA and RNA. In this embodiment, Fluorescein is used as fluorescent dye and DNA or RNA which is complementary to the DNA containing the specific gene is labeled therewith to prepare the probes. Since the denatured DNA fragments are fixed on the transfer support 12 at this time, only the DNA fragments which are complimentary to the probe DNA or probe RNA are hybridized to acquire the fluorescently labeled probe. Then, the probes which have not formed hybrids are removed by washing with a proper solution and only the DNA fragments having a specific gene form hybrids with the fluorescently labeled DNA or RNA on the transfer support 12 to be fluorescently labeled. The thus obtained transfer support records an electrophoresis image of the denatured DNA labeled with fluorescent dye.

When a radiation image, an autoradiographic image, a radiographic diffraction image or an electron microscopic image of an object recorded in a stimulable phosphor layer formed on a stimulable phosphor sheet is read out, instead of the fluorescent image carrier unit 30, a stimulable phosphor sheet unit 40 is set in the image reading apparatus.

Figure 2:
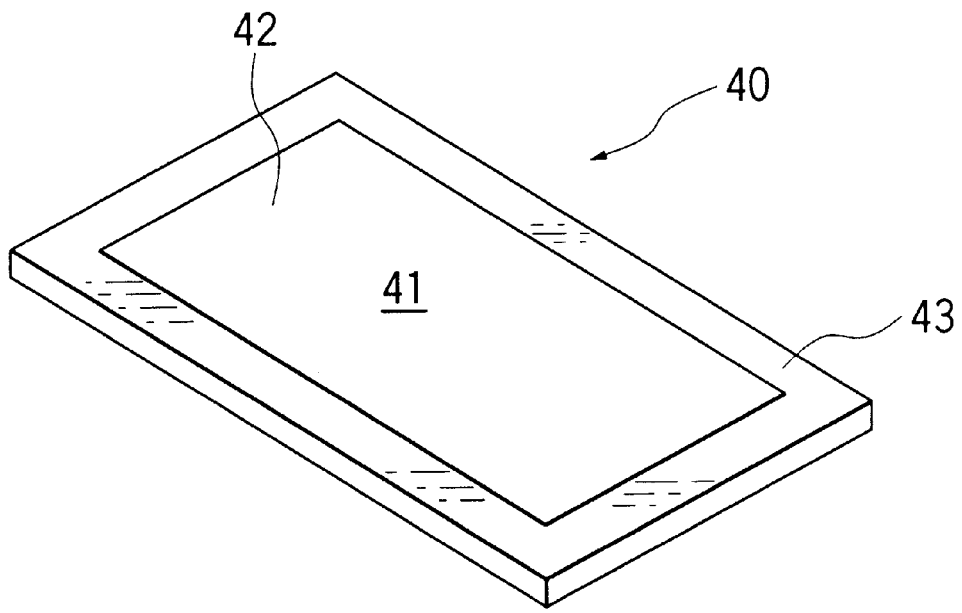
FIG. 2 is a schematic perspective view showing a stimulable phosphor sheet unit.

FIG. 2 is a schematic perspective view showing the stimulable phosphor sheet unit 40. As shown in FIG. 2, the stimulable phosphor sheet unit 40 includes a stimulable phosphor sheet 42 formed with a stimulable phosphor layer 41 on one surface thereof and a magnetic layer (not shown) on the other surface thereof and a support plate 43 such as an aluminum plate onto which a gum-like magnetic sheet (not shown) is adhered on one surface thereof. The magnetic layer of the stimulable phosphor sheet 42 and the magnet sheet of the support plate 43 are adhered by magnetic force and integrated.

The stimulable phosphor layer 41 formed on the stimulable phosphor sheet 42 records, for example, locational information regarding a radioactively labeled substance contained in a gene produced by the Southern blot hybridization method. Locational information as termed here includes a variety of information relating to the location of radioactive labeled substances, or aggregations thereof, present in a specimen, such as the location, the shape, the concentration, the distribution or combinations thereof.

The locational information regarding a radioactively labeled substance is stored in the stimulable phosphor layer 41 of the stimulable phosphor sheet 42, for example, in the following manner. First, a plurality of DNA fragments containing a specific gene are separated and distributed on a gel support medium by means of electrophoresis and are denatured by alkali processing to form single-stranded DNA. Then, according to the known Southern blotting method, the gel support and a transfer support such as a nitrocellulose filter are placed in layers to transfer at least a part of the denatured DNA fragments onto the transfer support and the transferred DNA fragments are fixed on the transfer support by heating. Further, probes prepared by radioactively labeling DNA or RNA which is complementary to the DNA containing the specific gene and the denatured DNA fragments are hybridized by heating to form double-stranded DNA fragments or combined DNA and RNA. Since the denatured DNA fragments are fixed on the transfer support at this time, only the DNA fragments which are complimentary to the probe DNA or probe RNA are hybridized to acquire the radioactively labeled probe. Then, the probes which have not formed hybrids are removed by washing with a proper solution and only the DNA fragments having a specific gene form hybrids with the radioactively labeled DNA or RNA on the transfer support to be radioactively labeled. The thus obtained transfer support and the stimulable phosphor layer 41 of the stimulable phosphor sheet 42 are stacked for a certain period of time to expose the stimulable phosphor layer 41 and at least a part of the radiation emitted from the radioactively labeled substance on the transfer support is absorbed in the stimulable phosphor layer 41 formed on the stimulable phosphor sheet 42, whereby the locational information regarding the radioactively labeled substance in the specimen is stored in the form of an image in the stimulable phosphor layer 41.

The fluorescent image carrier unit 30 or the stimulable phosphor sheet unit 40 is conveyed by a motor (not shown) in the direction of the arrow Y, namely, the sub-scanning direction in FIG. 1 in synchronism with the scanning with the laser beam 3 in the main scanning direction so that the whole surface of the transfer support 32 or the stimulable phosphor layer 41 is scanned by the laser beam 3.

A light guide 20 is positioned in the vicinity of the transfer support 32 or the stimulable phosphor layer 41 so as to face the scanning line on the transfer support 32 or the stimulable phosphor layer 41. The light receiving end of the light guide 20 has a linear shape and the exit end thereof is disposed close to the light receiving surface of a light detector 21 such as a photomultiplier for photoelectrically detecting light. This light guide 20 is made by processing a non-fluorescent glass or the like and so constituted that the emission introduced from the light receiving end is transmitted to the exit end under repeated total reflection within the light guide 20 and received by the light receiving surface of the light detector 21 via the exit end.

Therefore, the fluorescent light emitted from the fluorescent dye contained in the transfer support 32 or the stimulated emission produced by the stimulable phosphor contained in the stimulable phosphor layer 41 upon being irradiated with the laser beam 3 enters the light guide 20 and is received by the light detector 21 via the exit end under repeated total reflection within the light guide 20.

Figure 3:
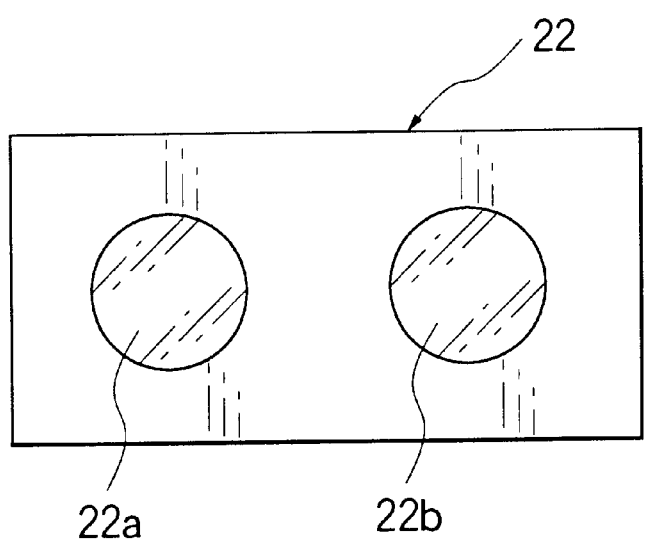
FIG. 3 is a schematic front view showing a filter member.

In front of the light receiving surface of the light detector 21 is provided a filter member 22. FIG. 3 is a schematic front view of the filter member 22. The filter member 22 is formed by a rectangular plate and provided with two filters 22a and 22b. The filter 22a has a property to allow only light of the wavelength region of the stimulated emission released from the stimulable phosphor to pass through and cuts off light having a wavelength of 633 nm and the filter 22b has a property to cut off light having a wavelength of 473 nm and transmit light having a wavelength longer than 473 nm.

When an image of fluorescent dye contained in the transfer support 32 is read out, the second laser stimulating ray source 2 is activated and the filter member 22 is rotated so that the filter 22b is positioned in front of the light receiving surface of the light detector 21. On the other hand, when a radiation image, an autoradiographic image, a radiographic diffraction image or an electron microscopic image of an object recorded in a stimulable phosphor layer 41 is read out, the first laser stimulating ray source 1 is activated and the filter member 22 is rotated so that the filter 22a is positioned in front of the light receiving surface of the light detector 21.

The first laser stimulating ray source 1 or the second laser stimulating ray source 2 and the filter 22a or the filter 22b are selected by a control unit 50. As shown in FIG. 1, the image reading apparatus further includes the control unit 50, input means 51 including a keyboard and a motor 52 for rotating the filter member 22. The control unit 50 is constituted so as to control the entire operation of the image reading apparatus in accordance with instruction signals input through the input means 51.

The light photoelectrically detected by the light detector 21 is converted to an electrical signal, amplified by an amplifier 23 having a predetermined amplifying factor so as to produce an electrical signal of a predetermined level and then input to an A/D converter 24. The electrical signal is converted in the A/D converter 24 to a digital signal with a scale factor suitable for the signal fluctuation width and input to a line buffer 25. The line buffer 25 temporarily stores image data corresponding to one scanning line. When the image data corresponding to one scanning line have been stored in the line buffer 25 in the above described manner, the line buffer 25 outputs the data to a transmitting buffer 26 whose capacity is greater than that of the line buffer 25 and when the transmitting buffer 26 has stored a predetermined amount of the image data, it outputs the image data to an image processing apparatus 27. The image data input to the image processing apparatus 27 are stored in an image data storing means (not shown). The image data are read out from the image data storing means, image-processed as occasion demands and displayed on display means such as a CRT (not shown) as a visual image or analyzed by an image analyzing apparatus (not shown).

Figure 4:
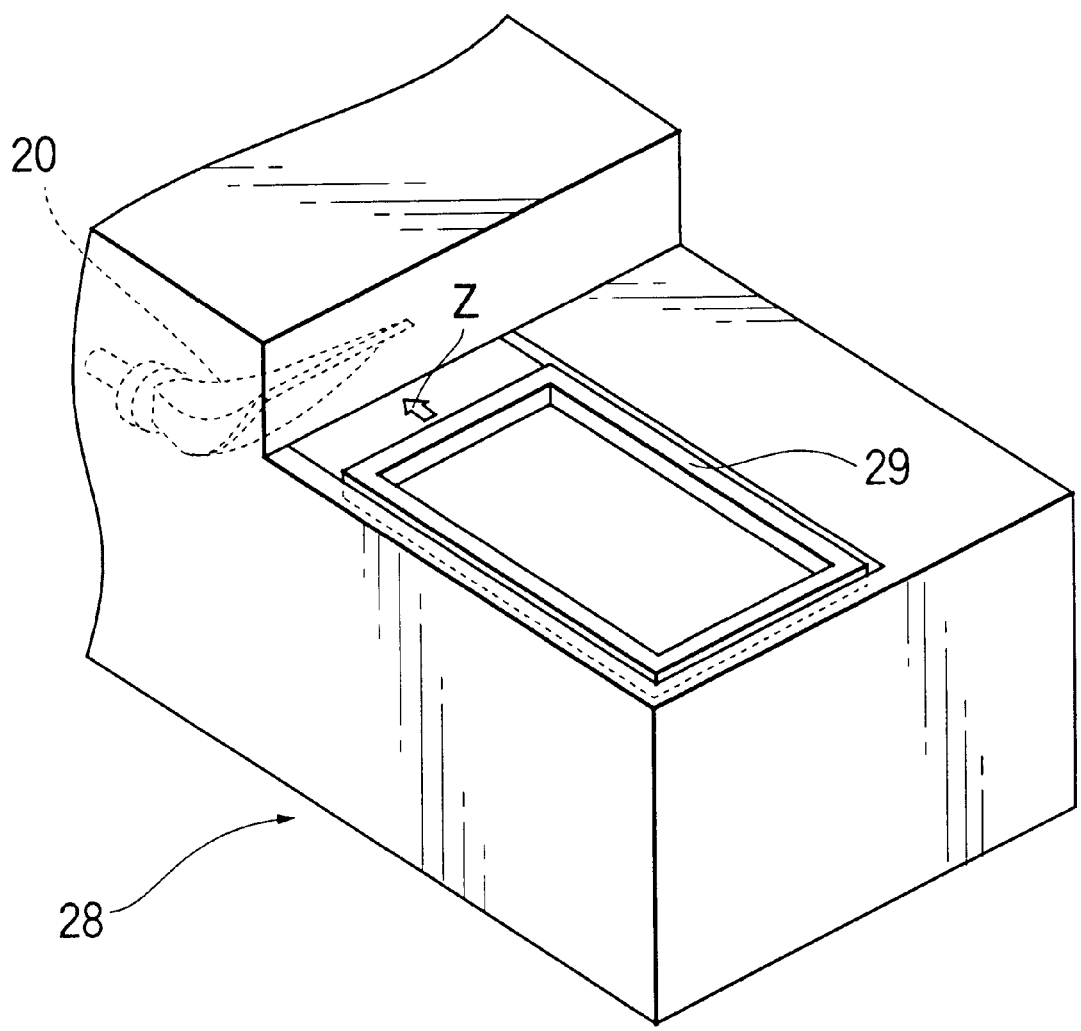
FIG. 4 is a schematic perspective view showing the exterior of an image reading apparatus which is an embodiment of the present invention.

FIG. 4 is a schematic perspective view showing the exterior of the image reading apparatus. As shown in FIG. 4, the image reading apparatus 28 includes a sample stage 29 on which the fluorescent image carrier unit 30 or the stimulable phosphor sheet unit 40 is set. The fluorescent image carrier unit 30 or the stimulable phosphor sheet unit 40 set on the sample stage 29 is conveyed by a conveyance mechanism (not shown) in the direction indicated by Z in FIG. 4 and is located at a predetermined position in the image reading apparatus 28 to be scanned with the laser beam 3.

When an electrophoresis image of denatured DNA labeled with fluorescent dye is to be read out, an instruction to this effect is input through the input means 51 and the fluorescent image carrier unit 30 is set on the sample stage 29. The fluorescent image carrier unit 30 set on the sample stage 29 is conveyed by the conveyance mechanism (not shown) in the direction indicated by Z in FIG. 4 and is located at a predetermined position in the image reading apparatus 28.

When an instruction to read the electrophoresis image of denatured DNA labeled with fluorescent dye is input through the input means 51, the control unit 50 drives the motor 52 to move the filter member 22 so that the filter 22b is located in front of the light receiving surface of the light detector 21 and then activates the second laser stimulating ray source 2 to emit a laser beam 3 having a wavelength of 473 nm. The beam diameter of the laser beam 3 is accurately adjusted by the beam expander 7 and the laser beam 3 impinges on the polygon mirror 8. The laser beam 3 deflected by the polygon mirror 8 passes through the f θ lens 9 and is reflected by the reflecting mirror 10, thereby impinging upon the transfer support 32 on the glass plate 31. Since the laser beam is scanned on the transfer support 32 in the main scanning direction, while the fluorescent image carrier unit 30 is moved in the sub-scanning direction, the whole surface of the transfer support 32 is scanned with the laser beam having a wavelength of 473 nm. As a result, Fluorescein contained in the transfer support 32 is excited and releases fluorescent light having a peak wavelength of 530 nm. In this embodiment, since fluorescent dye is excited using the second laser stimulating ray source 2 constituted by the second harmonic generation element for emitting a laser beam 3 having a wavelength of 473 nm, it is possible to excite the fluorescent dye with a stimulating ray having substantially the same strength as that of an argon laser beam at lower power than when using an argon laser beam source and, therefore, to cause the fluorescent dye to release a sufficient amount of fluorescent light while keeping the amount of energy consumption low.

Fluorescent light released from Fluorescein, which is the fluorescent dye contained in the transfer support 32, enters the light guide 20 and impinges on the filter 22b via the exit end of the light guide 20 under repeated total reflection within the light guide 20. Since the filter 22b has a property to cut off light having a wavelength of 473 nm and transmit light having a wavelength longer than 473 nm and the wavelength of the fluorescent light released from Fluorescein has a peak of 530 nm, which is longer than the wavelength of the stimulating ray, it is possible to easily separate fluorescent light released from Fluorescein from the stimulating ray having a wavelength of 473 nm and photoelectrically detect only it by the light detector 21 with high sensitivity.

The electrical signal photoelectrically detected and output by the light detector 21 is amplified by the amplifier 23 having a predetermined amplifying factor so as to produce an electrical signal of a predetermined level and then converted in the A/D converter 24 to a digital signal with a scale factor suitable for the signal fluctuation width. When the image data corresponding to one scanning line have been stored in the line buffer 25, the line buffer 25 outputs the image data to the transmitting buffer 26.

The image data obtained by detecting fluorescent light released from Fluorescein in this manner is output from the transmission buffer 26 to the image processing apparatus 27 and a visual image is displayed on the display means such as a CRT. The thus displayed image contains an image of DNA labeled with Fluorescein and the image data produced in the above described manner are stored in the image data storing means (not shown) or analyzed by the image analyzing apparatus (not shown) as occasion demands.

When a radiation image, an autoradiographic image, a radiographic diffraction image or an electron microscopic image of an object recorded in a stimulable phosphor layer 41 of the stimulable phosphor sheet 42 is to be read out, an instruction to the effect is input through the input means 51 and the stimulable phosphor unit 40 is set on the sample stage 29.

The stimulable phosphor sheet unit 40 set on the sample stage 29 is conveyed by the conveyance mechanism (not shown) in the direction indicated by Z in FIG. 4 and is located at a predetermined position in the image reading apparatus 28.

When an instruction to read the locational information regarding the radioactively labeled substance in the specimen recorded in the stimulable phosphor layer 41 of the stimulable phosphor sheet 42 is input through the input means 51, the control unit 50 drives the motor 52 to move the filter member 22 so that the filter 22a is located in front of the light receiving surface of the light detector 21 and then activates the first laser stimulating ray source 1 to emit a laser beam 3 having a wavelength of 633 nm.

The laser beam 3 emitted from the first laser stimulating ray source 1 passes through a filter 5, thereby cutting light in a wavelength region corresponding to a wavelength region of stimulated emission emitted from the stimulable phosphor layer 41 formed on the stimulable phosphor sheet 42 in response to stimulation by the laser beam 3 having a wavelength of 633 nm. The laser beam 3 transmitted through the filter 5 passes through the dichroic mirror 6 and enters the beam expander 7. The beam diameter of the laser beam 3 is accurately adjusted by the beam expander 7 and the laser beam 3 impinges on the polygon mirror 8. The laser beam 3 deflected by the polygon mirror 8 passes through the f θ lens 9 and is reflected by the reflecting mirror 10, thereby one-dimensionally impinging upon the sheet-like stimulable phosphor sheet unit 40.

The stimulable phosphor sheet unit 40 is moved in the sub-scanning direction indicated by Y in FIG. 1 in synchronism with the scanning with the laser beam 3 in the main scanning direction so that the whole surface of the stimulable phosphor layer 41 formed on the stimulable phosphor sheet 42 is scanned by the laser beam 3.

When the stimulable phosphor layer 41 is scanned with the laser beam having a wavelength of 633 nm in this manner, the stimulable phosphor contained in the stimulable phosphor layer 41 formed on the stimulable phosphor sheet 42 is stimulated to release the stimulated emission.

The stimulated emission released from the stimulable phosphor enters the light guide 20 and impinges on the filter 22a via the exit end of the light guide 20 under repeated total reflection within the light guide 20. Since the filter 22a has a property to allow only light of the wavelength region of the stimulated emission released from the stimulable phosphor to pass through and cuts off light having a wavelength of 633 nm, only the stimulated emission released from the stimulable phosphor is photoelectrically detected by the light detector 21 and an analog signal corresponding to the image of the locational information regarding the radioactively labeled substance is produced. The analog signal produced by the light detector 21 is amplified by the amplifier 23 having a predetermined amplifying factor so as to produce an electrical signal of a predetermined level and then converted in the A/D converter 24 to a digital signal with a scale factor suitable for the signal fluctuation width. When the image data corresponding to one scanning line have been stored in the line buffer 25, the line buffer 25 outputs the image data to the transmitting buffer 26.

The image data obtained by detecting the stimulated emission released from the stimulable phosphor in this manner is output from the transmission buffer 26 to the image processing apparatus 27 and a visual image is displayed on a display means such as a CRT. The thus displayed image contains an image of DNA labeled with the radioactively labeled substance and the image data produced in the above described manner are stored in the image data storing means (not shown) or analyzed by the image analyzing apparatus (not shown) as occasion demands.

According to this embodiment, both the electrophoresis image of DNA labeled with fluorescent dye and recorded in the transfer support 32 and the electrophoresis image of DNA labeled with the radioactively labeled substance and recorded in the stimulable phosphor layer 41 of the stimulable phosphor sheet 42 can be read by a single image reading apparatus. The efficiency is therefore high. Further, since fluorescent dye designed to be effectively excited by an argon laser beam of 488 nm is excited using the second laser stimulating ray source 2 for emitting a laser beam having a wavelength of 473 nm and the wavelength of fluorescent light released from the fluorescent dye upon being excited is longer than that of the stimulating ray, it is possible to more easily separate only the fluorescent light from the stimulating ray by the filter 22b and detect it by the light detector 21 than when using an argon laser beam source as a laser stimulating ray source. Moreover, since fluorescent dye is excited using the second laser stimulating ray source 2 constituted by the second harmonic generation element for emitting a laser beam 3 having a wavelength of 473 nm, it is possible to excite the fluorescent dye with a stimulating ray having substantially the same strength as that of an argon laser beam at lower power than when using the argon laser beam source and, therefore, to cause the fluorescent dye to release a sufficient amount of fluorescent light while keeping the amount of energy consumption low.

Figure 5:
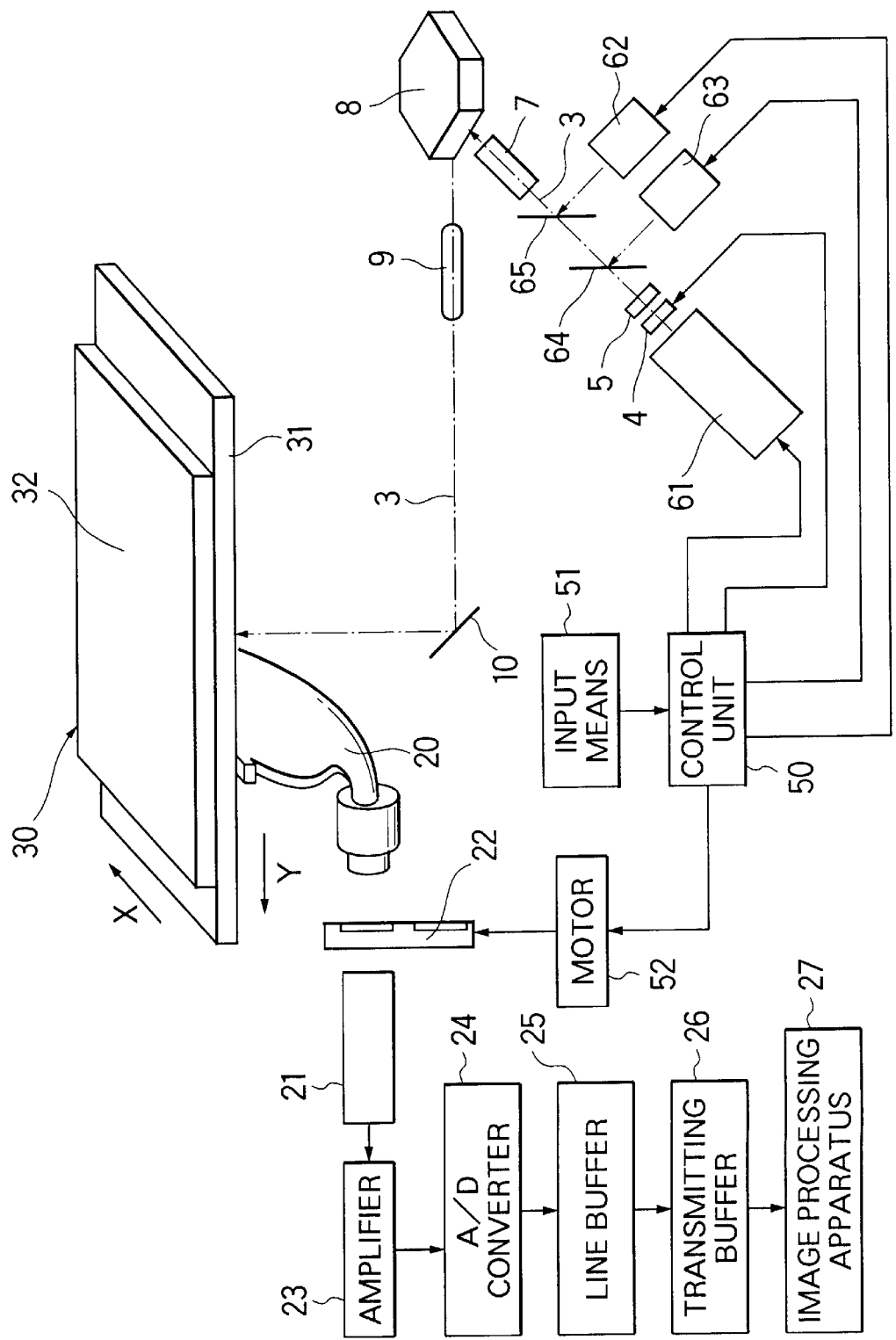
FIG. 5 is a schematic perspective view showing an image reading apparatus which is another preferred embodiment of the present invention.

FIG. 5 is a schematic perspective view showing an image reading apparatus which is another preferred embodiment of the present invention.

As shown in FIG. 5, the image reading apparatus in this embodiment includes a third laser stimulating ray source 63 for emitting a laser beam having a wavelength of 532 nm in addition to a first laser stimulating ray source 61 for emitting a laser beam having a wavelength of 633 nm and a second laser stimulating ray source 62 for emitting a laser beam having a wavelength of 473 nm. The third laser stimulating ray source 63 is constituted by the second harmonic generation element.

The laser beam 3 emitted from the first laser stimulating ray source 1 passes through the filter 5, thereby cutting light in a wavelength region corresponding to a wavelength region of stimulated emission emitted from the stimulable phosphor layer 41 formed on the stimulable phosphor sheet 42 in response to stimulation by the laser beam 3 having a wavelength of 633 nm. A dichroic mirror 64 is provided for transmitting light having a wavelength of 633 nm but reflecting light having a wavelength of 532 nm in an optical path of the laser beam 3 emitted from the third laser stimulating ray source 63 and a dichroic mirror 65 is provided for transmitting light having a wavelength equal to or longer than 532 nm but reflecting light having a wavelength of 473 nm in an optical path of the laser beam 3 emitted from the second laser stimulating ray source 62. The laser beam 3 emitted from the third laser stimulating ray source 63 is reflected by the dichroic mirror 64, thereby changing the direction thereof by about 90 degrees and passes through the dichroic mirror 65 to enter the beam expander 7. The laser beam 3 emitted from the first laser stimulating ray source 61 passes through the dichroic mirror 64 and the dichroic mirror 65 and the laser beam 3 emitted from the second laser stimulating ray source 62 is reflected by the dichroic mirror 65, thereby changing the direction thereof by about 90 degrees and the beams enter the beam expander 7. The beam diameter of the laser beam 3 is accurately adjusted by the beam expander 7 and the laser beam 3 impinges on the polygon mirror 8. The laser beam 3 deflected by the polygon mirror 8 passes through the f θ lens 9 and is reflected by the reflecting mirror 10, thereby one-dimensionally impinging upon the sheet-like fluorescent image carrier unit 30 or stimulable phosphor sheet unit 40.

Figure 6:
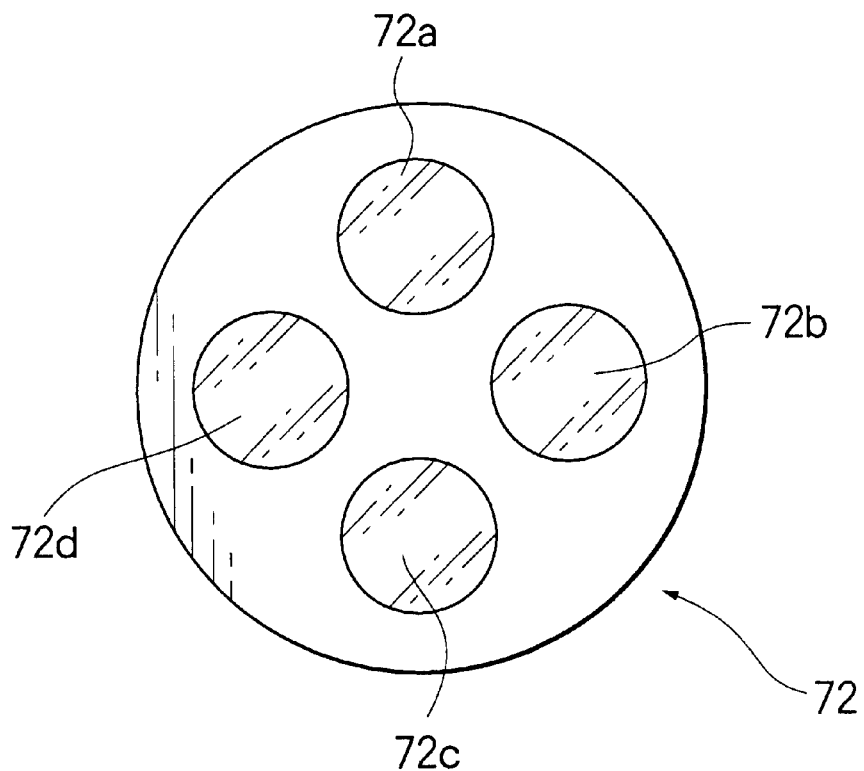
FIG. 6 is a schematic front view showing a filter member.

FIG. 6 is a schematic view showing a filter member 72 provided in front of the light detector 21 of the image reading apparatus 28 in this embodiment.

As shown in FIG. 6, the filter member 72 is constituted by a disk provided with four filters 72a, 72b, 72c and 72d. The filter 72a is used for reading fluorescent light released from fluorescent dye contained in the transfer support 32 upon being excited using the first laser stimulating ray source 61 and has a property to cut off light having a wavelength of 633 nm but transmit light having a wavelength longer than 633 nm. The filter 72b is used for reading fluorescent light released from fluorescent dye contained in the transfer support 32 upon being excited using the third laser stimulating ray source 63 and has a property to cut off light having a wavelength of 532 nm but transmit light having a wavelength longer than 532 nm. The filter 72c is used for reading fluorescent light released from fluorescent dye contained in the transfer support 32 upon being excited using the second laser stimulating ray source 62 and has a property to cut off light having a wavelength of 473 nm but transmit light having a wavelength longer than 473 nm. The filter 72d is used for reading stimulated emission released from the stimulable phosphor sheet 42 when the stimulable phosphor contained in the stimulable phosphor layer 41 formed on the stimulable phosphor sheet 42 is excited using the first laser stimulating ray source 61 and has a property to allow only light of the wavelength region of the stimulated emission released from the stimulable phosphor to pass through and cuts off light having a wavelength of 633 nm. Therefore, the light detector 21 can photoelectrically detect only light to be detected by selectively using these filters 72a, 72b, 72c, 72d in accordance with the laser stimulating ray source to be used, namely, the kinds of fluorescent dye and kinds of the image carrier. The filter member 72 is constituted so as to be rotatable, and a photomultiplier containing a bialkali material based on the compound $K_2CsSb$ prepared by activation with oxygen and cesium is used for the light detector 21.

In the image reading apparatus according to this embodiment, the laser stimulating ray source 61, 62, 63 to be employed and the filter 72a, 72b, 72c, 72d to be selected are determined in advance and stored in a memory (not shown) of the control unit 50. Therefore, when a fluorescent image recorded in the transfer support 32 is to be read, the user inputs the kind of fluorescent dye contained in the transfer support 32 through the input means 51 and when a radiation image recorded in the stimulable phosphor layer 41 formed on the stimulable phosphor sheet 42 is to be read, the user inputs through the input means 51 that the image carrier is a stimulable phosphor sheet 42. Then, the control unit 50 automatically selects one among the first laser stimulating ray source 61, the second laser stimulating ray source 62 and the third laser stimulating ray source 63 and also automatically selects one of the filters 72a, 72b, 72c and 72d and the image reading is started. More specifically, when the kind of fluorescent dye contained in the transfer support 32 is input through the input means 51, the control unit 50 drives the motor 52 to rotate the filter member 72 so that one of the filters 72a, 72b and 72c is positioned in front of the light detector 21 and also selectively activates one among the first laser stimulating ray source 61, the second laser stimulating ray source 62 and the third laser stimulating ray source 63 to emit a laser beam 3. When an instruction that the image carrier is a stimulable phosphor sheet 42 is input through the input means 51, the control unit 50 drives the motor 52 to rotate the filter member 72 so that the filter 72d is positioned in front of the light detector 21 and also activates the first laser stimulating ray source 61 to emit a laser beam 3, thereby starting the image reading.

In the case where an electrophoresis image of denatured DNA labeled with fluorescent dye contained in the transfer support 32 is to be read, the user sets the fluorescent image carrier unit 30 on the sample stage 29 of the image reading apparatus 28 to move the fluorescent image carrier unit 30 to the position shown in FIG. 5 and, at the same time, inputs the kind of fluorescent dye used for labeling the probe through the input means 51. The image reading apparatus according to this embodiment includes the first laser stimulating ray source 61 for emitting a laser beam having a wavelength of 633 nm, the second laser stimulating ray source 62 for emitting a laser beam having a wavelength of 473 nm and the third laser stimulating ray source 63 for emitting a laser beam having a wavelength of 532 nm and in this embodiment, DNA fragments of the target gene are labeled with three kinds of fluorescent dye, namely, Fluorescein, Rhodamine B and Cy-5. The wavelength of light capable of most efficiently stimulating Fluorescein is 490 nm, the wavelength of light capable of most efficiently stimulating Rhodamine B is 534 nm and the wavelength of light capable of most efficiently stimulating Cy-5 is 650 nm. Therefore, it is efficient to scan the transfer support 32 using the second laser stimulating ray source 62 for detecting DNA labeled with Fluorescein, to scan the transfer support 32 using the third laser stimulating ray source 63 for detecting DNA labeled with Rhodamine B and to scan the transfer support 32 using the first laser stimulating ray source 61 for detecting DNA labeled with Cy-5.

In view of the above, the image reading apparatus according to this embodiment is constituted so that the user can input and specify through the input means 51 the kind of fluorescent dye forming a fluorescent image to be read and the sequence of the fluorescent images to be read and when the user inputs an instruction signal through the input means 51 requesting that a fluorescent image of DNA labeled with Cy-5 be read first, a fluorescent image of DNA labeled with Rhodamine B be read second and a fluorescent image of DNA labeled with Fluorescein be read last, the control unit 50 first outputs a drive signal to the motor 52 to rotate the filter member 72 so that the filter 72a is positioned in front of the light receiving surface of the light detector 21. The control unit 50 then activates the first laser stimulating ray source 61 and turns on the light modulator 4 disposed in front of the first laser stimulating ray source 61. As a result, a laser beam having a wavelength of 633 nm is emitted from the first laser stimulating ray source 61 and passes through the light modulator 4, the dichroic mirrors 64, 65 and after the beam diameter of the laser beam 3 has been accurately adjusted by the beam expander 7, the laser beam 3 impinges the polygon mirror 8. The laser beam 3 deflected by the polygon mirror 8 passes through the f θ lens 9 and is reflected by the reflecting mirror 10, thereby impinging upon the transfer support 32. Since the laser beam is scanned on the surface of the transfer support 32 in the main scanning direction indicated by X in FIG. 5, while the fluorescent image carrier unit 30 is moved in the sub-scanning direction indicated by Y in FIG. 5, the whole surface of the transfer support 32 is scanned with the laser beam 3 having a wavelength of 633 nm. As a result, Cy-5 contained in the transfer support 32 is excited and releases fluorescent light having a peak wavelength of 667 nm.

The fluorescent light released from Cy-5 contained in the transfer support 32 enters the light guide 20 and impinges on the filter 72a via the exit end of the light guide 20 under repeated total reflection within the light guide 20. Since the filter 72a has a property to cut off light having a wavelength of 633 nm but transmit light having a wavelength longer than 633 nm and the wavelength of the fluorescent light released from fluorescent dye is longer than that of the stimulating ray, only the fluorescent light released from Cy-5 is photoelectrically detected by the light detector 21. The thus obtained electrical signal is amplified by the amplifier 23 so as to produce an electrical signal of a predetermined level and then converted in the A/D converter 24 to a digital signal with a scale factor suitable for the signal fluctuation width and image data corresponding to one scanning line are stored in the line buffer 25. When the image data corresponding to one scanning line have been stored in the line buffer 25, the line buffer 25 outputs the image data to the transmitting buffer 26.

The image data obtained by detecting fluorescent light released from Cy-5 in this manner is output from the transmission buffer 26 to the image processing apparatus 27 and a visual image is displayed on a display means such as a CRT. The thus displayed image contains an image of DNA labeled with Cy-5 and the image data produced in the above described manner are stored in the image data storing means (not shown) or analyzed by the image analyzing apparatus (not shown) as occasion demands.

When the excitation of fluorescent dye by the first laser stimulating ray source 61 has been completed, the control unit 50 turns off the light modulator 4 to cut the laser beam 3 emitted from the first laser stimulating ray source 61 and outputs a drive signal to a motor (not shown) to return the fluorescent image carrier unit 30 to its original position. The control unit 50 then outputs a drive signal to the motor 52 to rotate the filter member 72 so that the filter 72b is positioned in front of the light receiving surface of the light detector 21 and activates the third laser stimulating ray source 63. As a result, a laser beam having a wavelength of 532 nm is emitted from the third laser stimulating ray source 63, reflected by the dichroic mirror 64 and passes through the dichroic mirrors 65. After the beam diameter of the laser beam 3 has been accurately adjusted by the beam expander 7, the laser beam 3 impinges on the polygon mirror 8. The laser beam 3 deflected by the polygon mirror 8 passes through the f θ lens 9 and is reflected by the reflecting mirror 10, thereby impinging upon the transfer support 32. Since the laser beam 3 is scanned on the surface of the transfer support 32 in the main scanning direction, while the fluorescent image carrier unit 30 is moved in the sub-scanning direction, the whole surface of the transfer support 32 is scanned with the laser beam 3 having a wavelength of 532 nm. As a result, Rhodamine B contained in the transfer support 32 is excited and releases fluorescent light having a peak wavelength of 605 nm.

The fluorescent light released from Rhodamine B contained in the transfer support 32 enters the light guide 20 and impinges on the filter 72b via the exit end of the light guide 20 under repeated total reflection within the light guide 20. Since the filter 72b has a property to cut off light having a wavelength of 532 nm but transmit light having a wavelength longer than 532 nm and the wavelength of the fluorescent light released from fluorescent dye is longer than that of the stimulating ray, only the fluorescent light released from Rhodamine B is photoelectrically detected by the light detector 21. The thus obtained electrical signal is amplified by the amplifier 23 so as to produce an electrical signal of a predetermined level and then converted in the A/D converter 24 to a digital signal with a scale factor suitable for the signal fluctuation width and image data corresponding to one scanning line are stored in the line buffer 25. When the image data corresponding to one scanning line have been stored in the line buffer 25, the line buffer 25 outputs the image data to the transmitting buffer 26.

The image data obtained by detecting fluorescent light released from Rhodamine B in this manner is output from the transmission buffer 26 to the image processing apparatus 27 and a visual image is displayed on a display means such as a CRT. The thus displayed image contains an image of DNA labeled with Rhodamine B and the image data produced in the above described manner are stored in the image data storing means (not shown) or analyzed by the image analyzing apparatus (not shown) as occasion demands.

When the excitation of fluorescent dye by the third laser stimulating ray source 63 has been completed, the control unit 50 outputs a drive signal to the motor (not shown) to return the fluorescent image carrier unit 30 to its original position. The control unit 50 then outputs a drive signal to the motor 52 to rotate the filter member 72 so that the filter 72c is positioned in front of the light receiving surface of the light detector 21 and activates the second laser stimulating ray source 62. As a result, a laser beam having a wavelength of 473 nm is emitted from the second laser stimulating ray source 62 and reflected by the dichroic mirror 65 and after the beam diameter of the laser beam 3 has been accurately adjusted by the beam expander 7, the laser beam 3 impinges on the polygon mirror 8. The laser beam 3 deflected by the polygon mirror 8 passes through the f θ lens 9 and is reflected by the reflecting mirror 10, thereby impinging upon the transfer support 32. Since the laser beam 3 is scanned on the surface of the transfer support 32 in the main scanning direction, while the fluorescent image carrier unit 30 is moved in the sub-scanning direction, the whole surface of the transfer support 32 is scanned with the laser beam 3 having a wavelength of 473 nm. As a result, Fluorescein contained in the transfer support 32 is excited and releases fluorescent light having a peak wavelength of 530 nm. In this embodiment, since the fluorescent dye is stimulated using the second laser stimulating ray source 62 for emitting a laser beam 3 having a wavelength of 473 nm, the strength of the stimulating ray is higher than that emitted from an LED and, therefore, it is possible to generate a sufficiently great amount of fluorescent light from the fluorescent dye.

The fluorescent light released from Fluorescein contained in the transfer support 32 enters the light guide 20 and impinges on the filter 72c via the exit end of the light guide 20 under repeated total reflection within the light guide 20. Since the filter 72c has a property to cut off light having a wavelength of 473 nm but transmit light having a wavelength longer than 473 nm and the wavelength of the fluorescent light released from fluorescent dye is longer than that of the stimulating ray, only the fluorescent light released from Fluorescein is photoelectrically detected by the light detector 21. The thus obtained electrical signal is amplified by the amplifier 23 so as to produce an electrical signal of a predetermined level and then converted in the A/D converter 24 to a digital signal with a scale factor suitable for the signal fluctuation width and image data corresponding to one scanning line are stored in the line buffer 25. When the image data corresponding to one scanning line have been stored in the line buffer 25, the line buffer 25 outputs the image data to the transmitting buffer 26.

The image data obtained by detecting fluorescent light released from Fluorescein in this manner is output from the transmission buffer 26 to the image processing apparatus 27 and a visual image is displayed on a display means such as a CRT. The thus displayed image contains an image of DNA labeled with Fluorescein and the image data produced in the above described manner are stored in the image data storing means (not shown) or analyzed by the image analyzing apparatus (not shown) as occasion demands.

On the other hand, when an image of locational information regarding a radioactively labeled substance contained in a gene produced by the Southern blot hybridization method and recorded in the stimulable phosphor layer 41 formed on the stimulable phosphor sheet 42 is to be read, the user first sets the stimulable phosphor sheet unit 40 on the sample stage 29 of the image reading apparatus 28 so that the stimulable phosphor layer 41 is directed downwardly and is moved to a position where the fluorescent image carrier unit 30 is located in FIG. 5. Simultaneously, the user inputs an instruction through the input means 51 that the image carrier is a stimulable phosphor sheet 42. In accordance with the instruction signal input through the input means 51, the control unit 50 outputs a drive signal to the motor 52 to rotate the filter member 72 so that the filter 72d is positioned in front of the light receiving surface of the light detector 21. The control unit 50 then activates the first laser stimulating ray source 61 and turns on the light modulator 4. As a result, a laser beam 3 having a wavelength of 633 nm is emitted from the first laser stimulating ray source 61 and passes through the light modulator 4, the dichroic mirrors 64, 65 and after the beam diameter of the laser beam 3 has been accurately adjusted by the beam expander 7, the laser beam 3 impinges on the polygon mirror 8. The laser beam 3 deflected by the polygon mirror 8 passes through the f θ lens 9 and is reflected by the reflecting mirror 10, thereby impinging upon the stimulable phosphor layer 41 formed on the stimulable phosphor sheet 42. Since the laser beam 3 is scanned on the stimulable phosphor layer 41 formed on the stimulable phosphor sheet 42 in the main scanning direction indicated by X in FIG. 5, while the stimulable phosphor unit 40 is moved in the sub-scanning direction indicated by Y in FIG. 5, the whole surface of the stimulable phosphor layer 41 formed on the stimulable phosphor sheet 42 is scanned with the laser beam 3.

When the stimulable phosphor layer 41 is scanned with the laser beam 3 having a wavelength of 633 nm in this manner, the stimulable phosphor contained in the stimulable phosphor layer 41 formed on the stimulable phosphor sheet 42 is excited, thereby releasing stimulated emission.

The stimulated emission released from the stimulable phosphor enters the light guide 20 and impinges on the filter 72d via the exit end of the light guide 20 under repeated total reflection within the light guide 20. Since the filter 72d has a property to allow only light of the wavelength region of the stimulated emission released from the stimulable phosphor to pass through and cuts off light having a wavelength of 633 nm, only the stimulated emission released from the stimulable phosphor is photoelectrically detected by the light detector 21. The thus obtained electrical signal is amplified by the amplifier 23 so as to produce an electrical signal of a predetermined level and then converted in the A/D converter 24 to a digital signal with a scale factor suitable for the signal fluctuation width. The image data are further forwarded to the image processing apparatus 27 via the line buffer 25 and the transmitting buffer 26. A visual image is displayed on a display means such as a CRT based on the image data input to the image processing apparatus 27. The thus produced image data are stored in the image data storing means (not shown) or analyzed by the image analyzing apparatus (not shown) as occasion demands.

According to the above described embodiment, both the electrophoresis image of DNA labeled with fluorescent dye and recorded in the transfer support 32 and the electrophoresis image of DNA labeled with the radioactively labeled substance and recorded in the stimulable phosphor layer 41 formed on the stimulable phosphor sheet 42 can be read by a single image reading apparatus. The efficiency is therefore high. Furthermore, since the fluorescent dye is stimulated using the second laser stimulating ray source 62 for emitting a laser beam 3 having a wavelength of 473 nm, the strength of the stimulating ray is higher than that emitted from an LED and, therefore, it is possible to generate a sufficiently great amount of fluorescent light from the fluorescent dye. Moreover, since the third laser stimulating ray source 63 for emitting a laser beam 3 having a wavelength of 532 nm is provided in addition to the first laser stimulating ray source 61 for emitting a laser beam 3 having a wavelength of 633 nm and the second laser stimulating ray source 62 for emitting a laser beam 3 having a wavelength of 473 nm, the specimen can be labeled by fluorescent dye excitable by a laser beam 3 having a wavelength of 532 nm, thereby improving the utility of the fluorescence detecting system. Further, when the kind of fluorescent dye is input through the input means 51, the control unit 50 selects a filter suitable for detecting fluorescent light released from the input fluorescent dye from among the filters 72a, 72b and 72c and positions it in front of the light detector 21. The control unit 50 then selects a laser stimulating ray source suitable for exciting the input fluorescent dye from among the first laser stimulating ray source 61, the second laser stimulating ray source 62 and the third laser stimulating ray source 63 and causes it to emit a laser beam 3, thereby reading a fluorescent image. Or when an instruction that the image carrier is a stimulable phosphor sheet 42 is input through the input means 51, the control unit 50 selects the filter 72d suitable for detecting stimulated emission and positions it in front of the light detector 21. The control unit 50 then selects the first laser stimulating ray source 61 and causes it to emit a laser beam 3, thereby reading a radiation image. Therefore, the operation is very simple and it is possible to eliminate the risk of erroneously activating the second laser stimulating ray source 62 or the third laser stimulating ray source 63 when a radiation image recorded in the stimulable phosphor layer 41 formed on the stimulable phosphor sheet 42 is to be read. It is therefore possible to eliminate the risk of such an error causing a part of the radiation energy stored in the stimulable phosphor layer 41 to be released so that the radiation image cannot be accurately read or cannot be read at all as the case may be.

Figure 7:
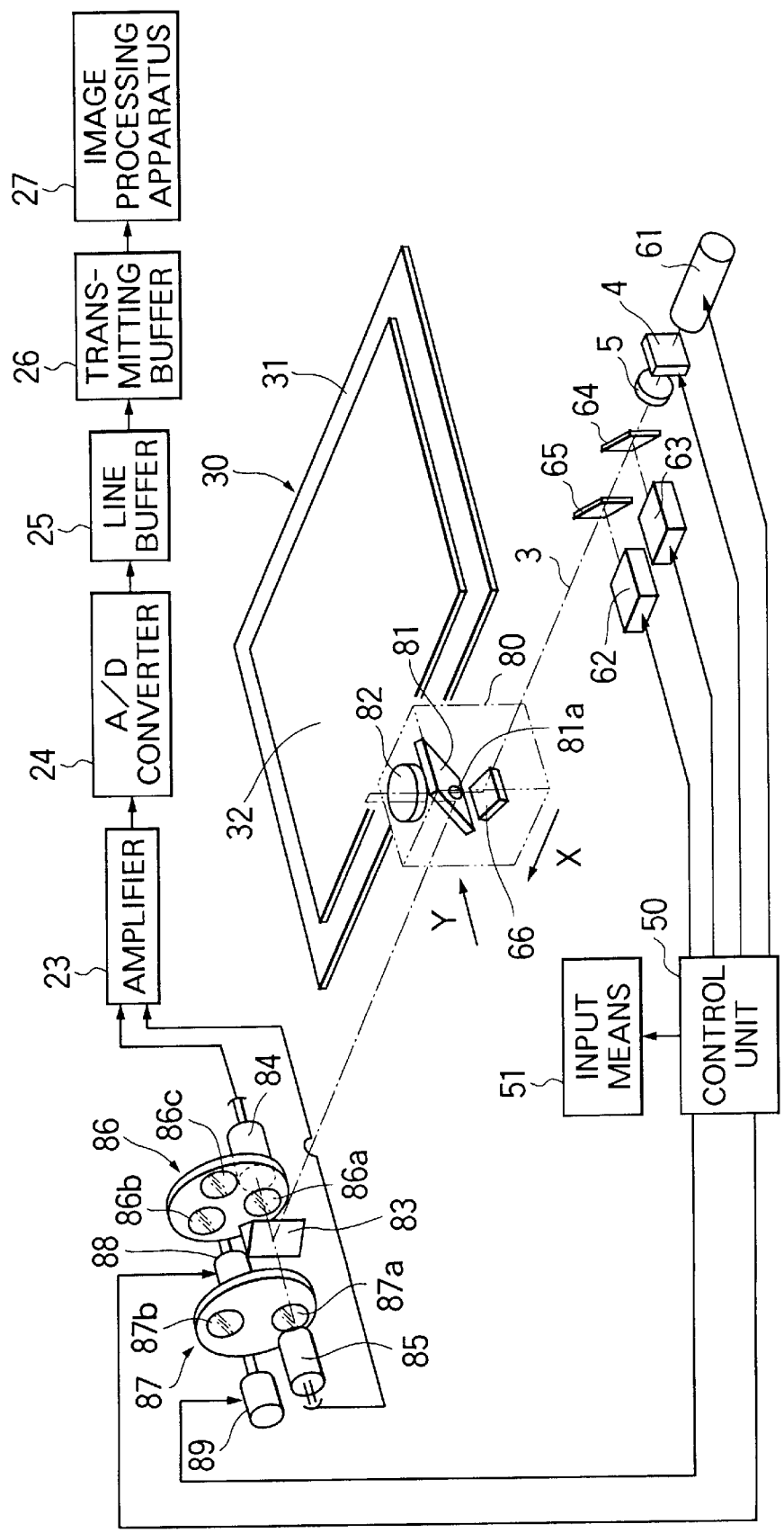
FIG. 7 is a schematic perspective view showing an image reading apparatus which is a further preferred embodiment of the present invention.

FIG. 7 is a schematic perspective view showing an image reading apparatus which is a further preferred embodiment of the present invention.

As shown in FIG. 7, the image reading apparatus according to this embodiment includes the first laser stimulating ray source 61, the second laser stimulating ray source 62, the third laser stimulating ray source 63, the filter 5 and the dichroic mirrors 64, 65 similarly to the image reading apparatus shown in FIG. 5. However, the image reading apparatus according to this embodiment is constituted so that both the fluorescent image carrier unit 30 and the stimulable phosphor sheet unit 40 are kept stationary and the whole surface of the transfer support 32 or the stimulable phosphor layer 41 of the stimulable phosphor sheet 42 can be scanned with a laser beam 3 by moving an optical head 80 provided with a mirror 81 formed with a hole 81a at the center thereof and a convex lens 82 for converging a laser beam 3 onto the image carrier. Therefore, a mirror 66 is employed instead of the polygon mirror 8. Further, the image reading apparatus is constituted so that fluorescent light emitted from the transfer support 32 or stimulated emission released from the stimulable phosphor sheet 42 is reflected by the mirror 81 to the side opposite from the first laser stimulating ray source 61, the second laser stimulating ray source 62 and the third laser stimulating ray source 63 and detected by two photomultipliers 84, 85 whose sensitivity characteristics are different from each other.

Figure 8:
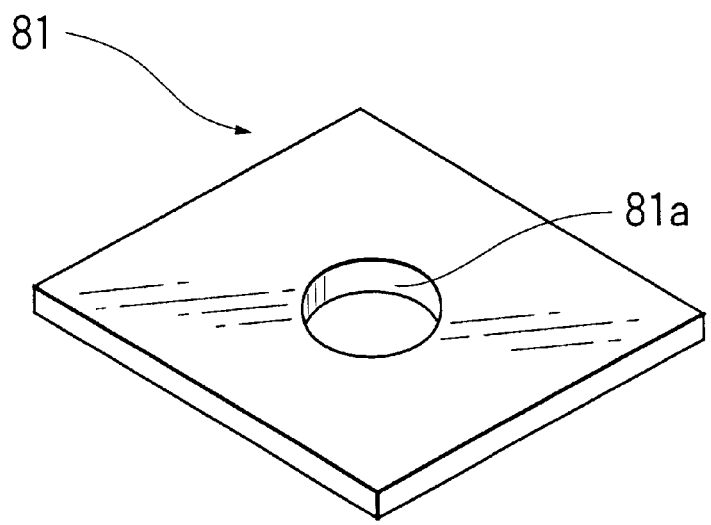
FIG. 8 is a schematic perspective view showing a mirror.

FIG. 8 is a schematic perspective view showing the mirror 81. As shown in FIG. 8, the hole 81a is formed at substantially the center of the mirror 81. The diameter of the hole 81a is determined so as to transmit a laser beam emitted from the first laser stimulating ray source 61, the second laser stimulating ray source 62 or the third laser stimulating ray source 63 therethrough but reflect fluorescent light from the transfer support 32 or stimulated emission from the stimulable phosphor sheet 42 as much as possible.

As shown in FIG. 7, the laser beam 3 reflected by the mirror 66 enters the optical head 80 and passes through the hole 81a of the mirror 81. The laser beam 3 is then converged by the convex lens 82 onto the surface of the transfer support 32 or the stimulable phosphor sheet 42, thereby exciting fluorescent dye or the stimulable phosphor. Fluorescent light from the transfer support 32 or stimulated emission from the stimulable phosphor sheet 42 is transformed to be a parallel light by the convex lens 82, reflected by the mirror 81 and further reflected by a triangular prism 83 in two directions to be lead to the first photomultiplier 84 and the second photomultiplier 85. The first photomultiplier 84 contains a bialkali material based on the compound $K_2CsSb$ prepared by activation with oxygen and cesium and can detect light having a wavelength of 200 nm to 650 nm with high sensitivity. The second photomultiplier 85 contains a bialkali material based on the compound $Na_2KSb$ prepared by activation with a small amount of cesium and can detect light having a wavelength of 200 nm to 850 nm with high sensitivity. Since two photomultipliers 84, 85 which can detect light of different wavelengths with high sensitivity are provided, the first photomultiplier 84 or the second photomultiplier 85 can be selectively used to photoelectrically detect light in accordance with the wavelength of light to be detected and the electrical signal so produced be used as image data, thereby improving the sensitivity of the image reading apparatus.

As shown in FIG. 7, a first filter member 86 and a second filter member 87 are disposed in front of the first photomultiplier 84 and the second photomultiplier 85. The first filter member 86 is constituted by a rotatable disk provided with three filters 86a, 86b and 86c. The filter 86a is used for reading fluorescent light released from fluorescent dye contained in the transfer support 32 upon being excited using the second laser stimulating ray source 62 and has a property to cut off light having a wavelength of 473 nm but transmit light having a wavelength longer than 473 nm. The filter 86b is used for reading fluorescent light released from fluorescent dye contained in the transfer support 32 upon being excited using the third laser stimulating ray source 63 and has a property to cut off light having a wavelength of 532 nm but transmit light having a wavelength longer than 532 nm. The filter 86c is used for reading stimulated emission released from the stimulable phosphor sheet 42 when the stimulable phosphor contained in the stimulable phosphor layer 41 formed on the stimulable phosphor sheet 42 is excited using the first laser stimulating ray source 61 and has a property to allow only light of the wavelength region of the stimulated emission released from the stimulable phosphor to pass through and cuts off light having a wavelength of 633 nm. The second filter member 87 is constituted by a rotatable disk provided with two filters 87a and 87b. The filter 87a is used for reading fluorescent light released from fluorescent dye contained in the transfer support 32 upon being excited using the first laser stimulating ray source 61 and has a property to cut off light having a wavelength of 633 nm but transmit light having a wavelength longer than 633 nm. The filter 87b is used for reading fluorescent light released from fluorescent dye contained in the transfer support 32 upon being excited using the third laser stimulating ray source 63 and has a property to cut off light having a wavelength of 532 nm but transmit light having a wavelength longer than 532 nm. Therefore, in accordance with the laser stimulating ray source to be employed for exciting fluorescent dye or a stimulable phosphor, namely, the kind of the image carrier and the kind of fluorescent dye, it is possible to detect only light to be detected with high sensitivity by selectively employing the photomultipliers 84, 85, the filters 86a, 86b, 86c and the filters 87a, 87b. The first filter member 86 and the second filter member 87 can be rotated by a first motor 88 and the second motor 89 respectively.

Figure 9:
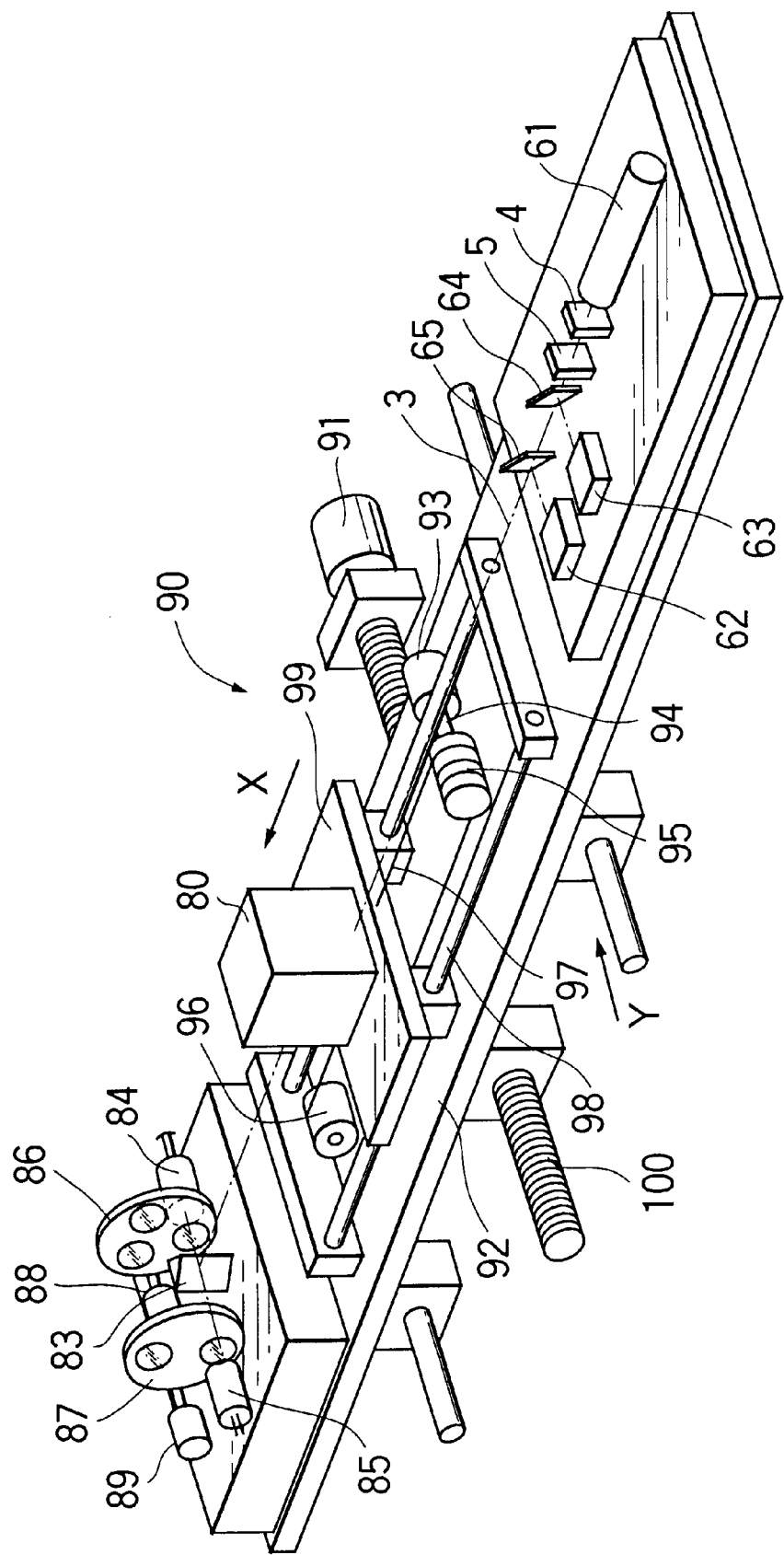
FIG. 9 is a schematic perspective view showing an optical unit.

FIG. 9 is a schematic perspective view showing an optical unit 90 provided with the optical head 80.

As shown in FIG. 9, the optical unit 90 includes a bed 92 movable by a sub-scanning motor 91 in a sub-scanning direction indicated by Y in FIG. 9, a main scanning motor 93 fixed on the bed 92, a drive rotating member 95 fixed to the output shaft 94 of the main scanning motor 93, a driven rotating member 96, a wire 97 wound around the drive rotating member 95 and the driven rotating member 96, an optical head stage 99 to which the ends of the wire are fixed and which is movable in a main scanning direction indicated by X in FIG. 9 while being guided by guide rails 98, and the optical head 80 fixed on the optical head stage 99. A threaded rod 100 is fixed to the output shaft (not shown) of the sub-scanning motor 91 and the bed 92 can be moved in the sub-scanning direction as the sub-scanning motor 91 rotates. The first photomultiplier 84, the second photomultiplier 85, the first filter member 86, the second filter member 87, the first motor 88 and the second motor 89 are fixed on the bed 92.

FIG. 7 shows an example in which an image of fluorescent dye recorded in the transfer support 32 is to be read. In the case where the image of fluorescent dye is to be read, the kind of fluorescent dye is input by the user through the input means 51 and in accordance with the input instruction signal, the control unit 50 activates one among the first laser stimulating ray source 61, the second laser stimulating ray source 62 and the third laser stimulating ray source 63. A laser beam 3 emitted from the selected one of the first laser stimulating ray source 61, the second laser stimulating ray source 62 and the third laser stimulating ray source 63 and reflected by the mirror 66 passes through the hole 81a of the mirror 81 and is converged by the convex lens 82 onto the surface of the transfer support 32 on the glass plate 31. As a result, fluorescent dye contained in the transfer support 32 is excited to release fluorescent light.

The fluorescent light released from the fluorescent dye contained in the transfer support 32 is transformed to be parallel light by the convex lens 82 and reflected by the mirror 81 in the direction opposite from the first laser stimulating ray source 61, the second laser stimulating ray source 62 and the third laser stimulating ray source 63. The fluorescent light impinges on the triangular prism 83 and is reflected in two directions.

In this embodiment, DNA fragments of the target gene are also labeled with three kinds of fluorescent dye, namely, Fluorescein, Rhodamine B and Cy-5, and a fluorescent image is recorded. When the fluorescent images of DNA fragments of the target gene labeled with Cy-5, Rhodamine B and Fluorescein are read in this order, the user inputs through the input means 51 an instruction requesting that the fluorescent images be subsequently read and the kinds of fluorescent dye subsequently read.

When such instruction signals are input through the input means 51, in accordance with the instruction signals, the control unit 50 outputs a drive signal to the second motor 89 to rotate the second filter member 87 so that the filter 87a is positioned in front of the light receiving surface of the second photomultiplier 85. The control unit 50 then activates the first laser stimulating ray source 61 and turns on the light modulator 4. As a result, a laser beam 3 having a wavelength of 633 nm is emitted from the first laser stimulating ray source 61 and passes through the light modulator 4 and the dichroic mirrors 64, 65. The laser beam 3 is then reflected by the mirror 66 and enters the optical head 80. The laser beam 3 entering the optical head 80 passes through the hole 81a of the mirror 81 and is converged by the convex lens 82 onto the transfer support 32. Since the optical head 80 is moved by the main scanning motor 93 in the main scanning direction indicated by X in FIGS. 7 and 9, while the bed 92 on which the optical head 80 is mounted is moved by the sub-scanning motor 91 in the sub-scanning direction indicated by Y in FIGS. 7 and 9, the whole surface of the transfer support 32 is scanned with the laser beam 3 having a wavelength of 633 nm. As a result, Cy-5 contained in the transfer support 32 is excited to release fluorescent light whose peak wavelength is 667 nm.

The fluorescent light released from Cy-5 contained in the transfer support 32 is reflected by the mirror 81 and further reflected by the triangular mirror 83 in two directions to be photoelectrically detected by the first photomultiplier 84 and the second photomultiplier 85.

When an instruction signal requesting that the image of fluorescent dye Cy-5 be read first has been input through the input means 51, the control unit 50 forwards only an electrical signal produced by photoelectrically detecting the fluorescent light by the second photomultiplier 85 to the line buffer 25 via the amplifier 23 and the A/D converter 24 and image data corresponding to one scanning line are stored in the line buffer 25. When the image data corresponding to one scanning line have been stored in the line buffer 25, the image data are output from the line buffer 25 to the transmission buffer 26.

The image data obtained by detecting the fluorescent light released from Cy-5 are output from the transmission buffer 26 to the image processing apparatus 27 and a visual image is displayed on a display means such as a CRT. The thus displayed image contains the image of DNA labeled with Cy-5 and the image data produced in this manner are stored in an image data storing means (not shown) or analyzed by an image analyzing apparatus (not shown).

When the excitation by the first laser stimulating ray source 61 has been completed, the control unit 50 turns off the light modulator 4 and cuts the laser beam 3 emitted from the first laser stimulating ray source 61. The control unit 50 outputs a drive signal to the sub-scanning motor 91 to return the bed 92 to its original position and outputs a drive signal to the main scanning motor 93 to return the optical head 80 to its original position. The control unit 50 then outputs a drive signal to the first motor 88 to rotate the first filter member 86 so that the filter 86b is positioned in front of the light receiving surface of the first photomultiplier 84 and activates the third laser stimulating ray source 63. As a result, a laser beam 3 having a wavelength of 532 nm is emitted from the third laser stimulating ray source 63 and is reflected by the dichroic mirror 64. After the laser beam 3 has passed through the dichroic mirror 65, it is then reflected by the mirror 66 and enters the optical head 80. The laser beam 3 entering the optical head 80 passes through the hole 81a of the mirror 81 and is converged by the convex lens 82 onto the transfer support 32. Since the optical head 80 is moved by the main scanning motor 93 in the main scanning direction indicated by X in FIGS. 7 and 9, while the bed 92 on which the optical head 80 is mounted is moved by the sub-scanning motor 91 in the sub-scanning direction indicated by Y in FIGS. 7 and 9, the whole surface of the transfer support 32 is scanned with the laser beam 3 having a wavelength of 532 nm. As a result, Rhodamine B contained in the transfer support 32 is excited to release fluorescent light whose peak wavelength is 605 nm.

The fluorescent light released from Rhodamine B contained in the transfer support 32 is reflected by the mirror 81 and further reflected by the triangular mirror 83 in two directions to be photoelectrically detected by the first photomultiplier 84 and the second photomultiplier 85.

When an instruction signal requesting that the image of fluorescent dye Rhodamine B be read after reading the fluorescent image of Cy-5 has been input through the input means 51, the control unit 50 forwards only an electrical signal produced by photoelectrically detecting the fluorescent light by the first photomultiplier 84 to the line buffer 25 via the amplifier 23 and the A/D converter 24 and image data corresponding to one scanning line are stored in the line buffer 25. When the image data corresponding to one scanning line have been stored in the line buffer 25, the image data are output from the line buffer 25 to the transmission buffer 26.

The image data obtained by detecting the fluorescent light released from Rhodamine B are output from the transmission buffer 26 to the image processing apparatus 27 and a visual image is displayed on a display means such as a CRT. The thus displayed image contains the image of DNA labeled with Rhodamine B and the image data produced in this manner are stored in an image data storing means (not shown) or analyzed by an image analyzing apparatus (not shown).

When the excitation by the third laser stimulating ray source 63 has been completed, the control unit 50 outputs a drive signal to the sub-scanning motor 91 to return the bed 92 to its original position and outputs a drive signal to the main scanning motor 93 to return the optical head 80 to its original position. The control unit 50 then outputs a drive signal to the first motor 88 to rotate the first filter member 86 so that the filter 86a is positioned in front of the light receiving surface of the first photomultiplier 84 and activates the second laser stimulating ray source 62. As a result, a laser beam 3 having a wavelength of 473 nm is emitted from the second laser stimulating ray source 62 and is reflected by the dichroic mirror 65. The laser beam 3 is then reflected by the mirror 66 and enters the optical head 80. The laser beam 3 entering the optical head 80 passes through the hole 81a of the mirror 81 and is converged by the convex lens 82 onto the transfer support 32. Since the optical head 80 is moved by the main scanning motor 93 in the main scanning direction indicated by X in FIGS. 7 and 9, while the bed 92 on which the optical head 80 is mounted is moved by the sub-scanning motor 91 in the sub-scanning direction indicated by Y in FIGS. 7 and 9, the whole surface of the transfer support 32 is scanned with the laser beam 3 having a wavelength of 473 nm. As a result, Fluorescein contained in the transfer support 32 is excited to release fluorescent light whose peak wavelength is 530 nm. In this embodiment, since the fluorescent dye is stimulated using the second laser stimulating ray source 62 for emitting a laser beam 3 having a wavelength of 473 nm, the strength of the stimulating ray is higher than that emitted from an LED and, therefore, it is possible to generate a sufficiently great amount of fluorescent light from the fluorescent dye.

The fluorescent light released from Fluorescein contained in the transfer support 32 is reflected by the mirror 81 and further reflected by the triangular mirror 83 in two directions to be photoelectrically detected by the first photomultiplier 84 and the second photomultiplier 85.

When an instruction signal requesting that the image of fluorescent dye Fluorescein be read last has been input through the input means 51, the control unit 50 forwards only an electrical signal produced by photoelectrically detecting the fluorescent light by the first photomultiplier 84 to the line buffer 25 via the amplifier 23 and the A/D converter 24 and image data corresponding to one scanning line are stored in the line buffer 25. When the image data corresponding to one scanning line have been stored in the line buffer 25, the image data are output from the line buffer 25 to the transmission buffer 26.

The image data obtained by detecting the fluorescent light released from Fluorescein are output from the transmission buffer 26 to the image processing apparatus 27 and a visual image is displayed on a display means such as a CRT. The thus displayed image contains the image of DNA labeled with Fluorescein and the image data produced in this manner are stored in an image data storing means (not shown) or analyzed by an image analyzing apparatus (not shown).

On the other hand, when a radiation image, an autoradiographic image, a radiographic diffraction image or an electron microscopic image of an object recorded in a stimulable phosphor layer 41 of the stimulable phosphor sheet 42 is read out, instead of the fluorescent image carrier unit 30, the stimulable phosphor sheet unit 40 is set in the image reading apparatus 28 and the stimulable phosphor sheet 42 formed with the stimulable phosphor layer 41 recording locational information regarding a radioactively labeled substance contained in a gene produced by the Southern blot hybridization method is scanned with the laser beam 3.

When a radiation image is read from the stimulable phosphor sheet 42 recording locational information regarding a radioactively labeled substance in a specimen, the user inputs an instruction that the image carrier is a stimulable phosphor sheet 42. As a result, the control unit 50 outputs a drive signal to the first motor 88 to rotate the first filter member 86 so that the filter 86c is positioned in front of the light receiving surface of the first photomultiplier 84. The control unit 50 then activates the first laser stimulating ray source 61 and turns on the light modulator 4. As a result, a laser beam emitted from the first laser stimulating ray source 61 passes through the light modulator 4 and the hole 81a formed in the mirror 81 of the optical head 80 and is converged by the convex lens 82 onto the surface of the stimulable phosphor layer 41 formed on the stimulable phosphor sheet 41, whereby the surface of the stimulable phosphor layer 41 is scanned with the laser beam 3 having a wavelength of 633 nm in the same manner as the transfer support 32 and the stimulable phosphor contained in the stimulable phosphor layer 41 is excited by the laser beam 3 to release stimulated emission. The stimulated emission is transformed to parallel light by the convex lens 82 and is reflected by the mirror 81. The stimulated emission is further reflected by the triangular prism 83 in two directions and photoelectrically detected by the first photomultiplier 84 and the second photomultiplier 85.

When the instruction that the image carrier is a stimulable phosphor 42 has been input through the input means 51, the control unit 50 forwards only an electrical signal produced by photoelectrically detecting the stimulated emission by the first photomultiplier 84 to the line buffer 25 via the amplifier 23 and the A/D converter 24 and image data corresponding to one scanning line are stored in the line buffer 25. When the image data corresponding to one scanning line have been stored in the line buffer 25, the image data are output from the line buffer 25 to the transmission buffer 26.

The image data obtained by detecting the stimulated emission released from the stimulable phosphor contained in the stimulable phosphor layer 41 formed on the stimulable phosphor sheet 42 are output from the transmission buffer 26 to the image processing apparatus 27 and a visual image is displayed on a display means such as a CRT. The thus displayed image contains the image of DNA labeled with the radioactively labeled substance and the image data produced in this manner are stored in an image data storing means (not shown) or analyzed by an image analyzing apparatus (not shown).

According to the above described embodiment, both the electrophoresis image of DNA labeled with fluorescent dye and recorded in the transfer support 32 and the electrophoresis image of DNA labeled with the radioactively labeled substance and recorded in the stimulable phosphor layer 41 formed on the stimulable phosphor sheet 42 can be read by a single image reading apparatus. The efficiency is therefore high. Further, in this embodiment, the laser beam 3 emitted from the first laser stimulating ray source 61, the second laser stimulating ray source 62 or the third laser stimulating ray source 63 passes through the hole 81a formed in the mirror 81 of the optical head 80 and is converged by the convex lens 82 onto the surface of the transfer support 32 or the stimulable phosphor layer 41. The surface of the transfer support 32 or the stimulable phosphor layer 41 is scanned with the laser beam 3 by moving the optical head 80 in both the main scanning direction and the sub-scanning direction, whereby fluorescent light or stimulated emission is released from the transfer support 32 or the stimulable phosphor layer 41. The fluorescent light or the stimulated emission is reflected by the mirror 81 in the direction opposite from the first laser stimulating ray source 61, the second laser stimulating ray source 62 and the third laser stimulating ray source 63 and photoelectrically detected by the first photomultiplier 84 and the second photomultiplier 85. Therefore, according to this embodiment, even if the second harmonic generation element capable of emitting a stimulating ray having high strength is used instead of an LED as the second laser stimulating ray source 62 or the third laser stimulating ray source 62, the surface of the transfer support 32 or the stimulable phosphor layer 41 can be scanned with the laser beam 3 with a simple structure and at high speed and, therefore, detection sensitivity can be markedly improved. Furthermore, since fluorescent dye contained in the transfer support 32 is excited using the first laser stimulating ray source 61 for emitting a laser beam 3 having a wavelength of 633 nm, the second laser stimulating ray source 62 for emitting a laser beam 3 having a wavelength of 473 nm and the third laser stimulating ray source 63 for emitting a laser beam 3 having a wavelength of 532 nm and a fluorescent image recorded in the transfer support 32 is read by a single image reading apparatus, it is possible to label a specimen with fluorescent dye excitable with a laser beam 3 having a wavelength of 633 nm, fluorescent dye excitable with a laser beam 3 having a wavelength of 532 nm and fluorescent dye excitable with a laser beam 3 having a wavelength of 473 nm and the utility of the fluorescence detecting system can be improved. Further, since the first photomultiplier 84 and the second photomultiplier 85 differing in sensitivity are provided, fluorescent light and stimulated emission can be detected with high sensitivity. Furthermore, when the kind of fluorescent dye is input through the input means 51, the control unit 50 selects whichever of the first photomultiplier 84 and the second photomultiplier 85 is suitable for detecting fluorescent light released from the specified fluorescent dye and rotates the first filter member 86 or the second filter member 87 to select a filter suitable for detecting fluorescent light released from the specified fluorescent dye from among the filters 86a, 86b, 86c and 87a, 87b and position it in front of the first photomultiplier 84 or the second photomultiplier 85. The control unit 50 then selects a laser stimulating ray source suitable for exciting the specified fluorescent dye forming a fluorescent image to be read from among the first laser stimulating ray source 61, the second laser stimulating ray source 62 and the third laser stimulating ray source 63 and causes it to emit a laser beam 3, thereby reading a fluorescent image. Or when an instruction that the image carrier is a stimulable phosphor sheet 42 is input through the input means 51, the control unit 50 selects the first photomultiplier 84 suitable for detecting stimulated emission and rotates the first filter member 86 to position the filter 86c in front of the first photomultiplier 84. The control unit 50 then activates the first laser stimulating ray source 61 suitable for exciting the stimulable phosphor and causes it to emit a laser beam 3, thereby reading a radiation image. Therefore, the operation is very simple and it is possible to eliminate the risk of erroneously activating the second laser stimulating ray source 62 or the third laser stimulating ray source 63 when a radiation image recorded in the stimulable phosphor layer 41 formed on the stimulable phosphor sheet 42 is to be read. It is therefore possible to eliminate the risk of such an error causing a part of radiation energy stored in the stimulable phosphor layer 41 to be released so that the radiation image cannot be accurately read or cannot be read at all as the case may be.

Figure 10:
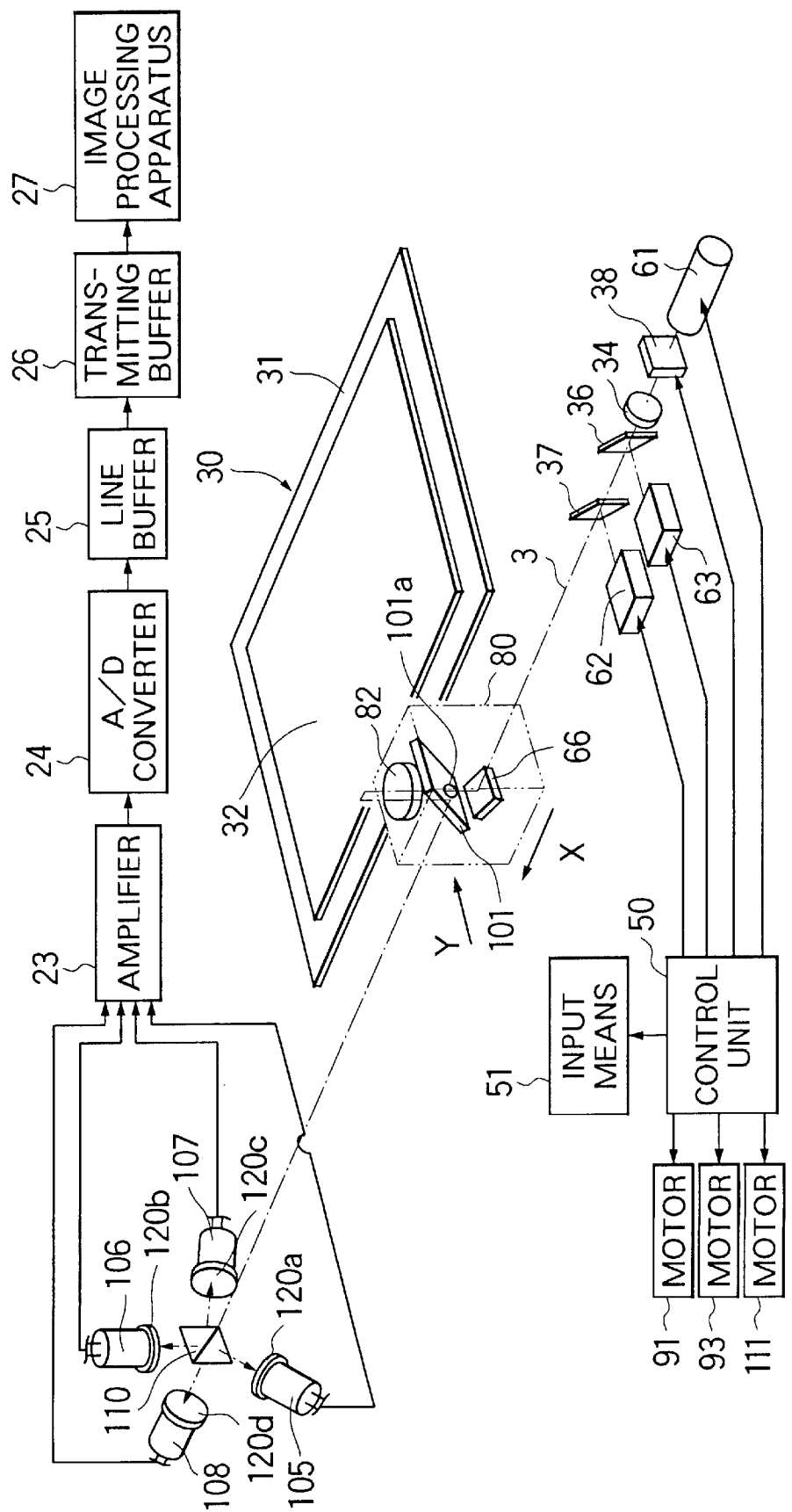
FIG. 10 is a schematic perspective view showing an image reading apparatus which is a further preferred embodiment of the present invention.

FIG. 10 is a schematic perspective view showing an image reading apparatus which is a further preferred embodiment of the present invention.

Figure 11:
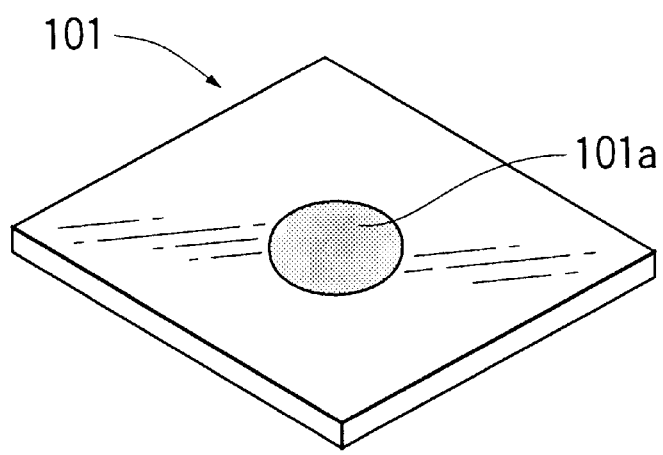
FIG. 11 is a schematic perspective view showing a mirror.

As shown in FIG. 10, similarly to the image reading apparatus shown in FIG. 7, the image reading apparatus according to this embodiment includes the first laser stimulating ray source 61, the second laser stimulating ray source 62, the third laser stimulating ray source 63, the filter 5, the dichroic mirrors 64 and 65, the mirror 66, and the optical head 80 provided with the mirror and the convex lens 82. However, as shown in FIG. 11, the image reading apparatus according to this embodiment is different from that shown in FIG. 7 in that, instead of the mirror 81 formed with the hole 81a, a mirror 101 is used, which is formed with a coating portion 101a having a coating capable of transmitting a laser beam 3 emitted from the first laser stimulating ray source 61, the second laser stimulating ray source 62 or the third laser stimulating ray source 63 and fluorescent light from the transfer support 32 or stimulated emission from the stimulable phosphor sheet 42 is reflected by the mirror 101 and photoelectrically detected by four photomultipliers 105, 106, 107 and 108.

FIG. 10 also shows an example in which an image of fluorescent dye recorded in the transfer support 32 is to be read. In this case, the kind of fluorescent dye is input by the user through the input means 51 and in accordance with the input instruction signal, the control unit 50 activates one of the first laser stimulating ray source 61, the second laser stimulating ray source 62 and the third laser stimulating ray source 63. A laser beam 3 emitted from one of the first laser stimulating ray source 61, the second laser stimulating ray source 62 and the third laser stimulating ray source 63 and reflected by the mirror 66 passes through the coating portion 101a formed in the mirror 101 and is converged by the convex lens 82 onto the surface of the transfer support 32 on the glass plate 31. As a result, fluorescent dye contained in the transfer support 32 is excited to release fluorescent light.

The fluorescent light released from the fluorescent dye contained in the transfer support 32 is transformed to be parallel light by the convex lens 82 and reflected by the mirror 101 in the direction opposite from the first laser stimulating ray source 61, the second laser stimulating ray source 62 and the third laser stimulating ray source 63. The fluorescent light impinges on a triangular cone mirror 110 and is reflected in three directions.

Figure 12:
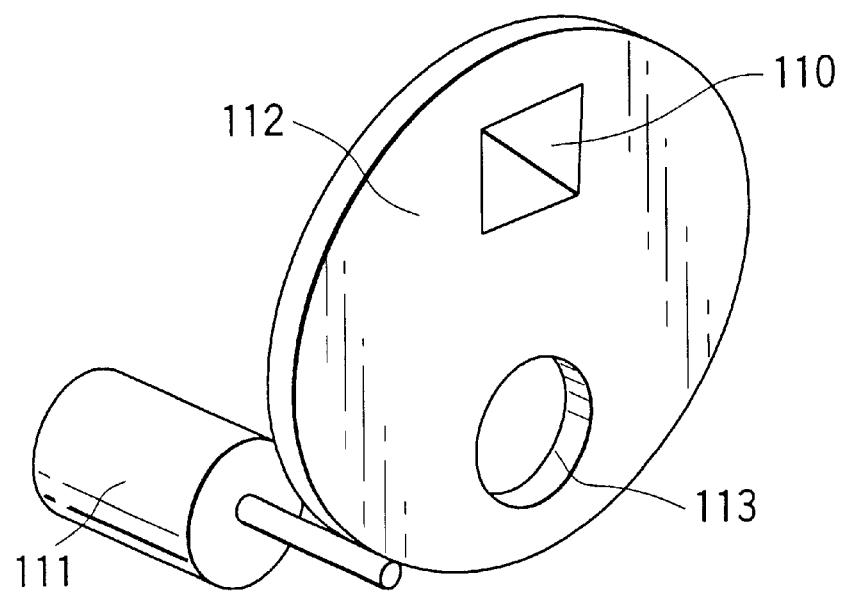
FIG. 12 is a schematic perspective view showing a disk on which a trigonal pyramid mirror is mounted.

As shown in FIG. 12, the triangular cone mirror 110 is mounted on a disk 112 rotatable by a motor 111 and the disk 112 is formed with a hole 113 through which fluorescent light or stimulated emission reflected by the mirror 101 can pass. The motor 111 is driven by the control unit 50 and rotates the disk 112 so that when a fluorescent image recorded in the transfer support 32 is read, the triangular cone mirror 110 is positioned in the optical path of the fluorescent light reflected by the mirror 101 and that when a radiation image recorded in the stimulable phosphor layer 41 is read, the hole 113 is positioned in the optical path of the fluorescent light reflected by the mirror 101.

The fluorescent light reflected by the triangular cone mirror 110 in three directions is received by the first photomultiplier 105, the second photomultiplier 106 and the third photomultiplier 107. A filter 120a is disposed in front of the first photomultiplier 105 for cutting off light having a wavelength of 473 nm but transmitting light having a wavelength longer than 473 nm and a filter 120b is disposed in front of the second photomultiplier 106 for cutting off light having a wavelength of 532 nm but transmitting light having a wavelength longer than 532 nm. A filter 120c is further disposed in front of the third photomultiplier 107 for cutting off light having a wavelength of 633 nm but transmitting light having a wavelength longer than 633 nm.

The fourth photomultiplier 108 is disposed in an extending portion of the optical path of the fluorescent light or the stimulated emission reflected by the mirror 101. A filter 120d is disposed in front of the fourth photomultiplier 108 for allowing only light of the wavelength region of the stimulated emission released from the stimulable phosphor to pass through and cutting off light having a wavelength of 633 nm.

In the thus constituted image reading apparatus according to this embodiment, even when DNA fragments of the target gene distributed on the transfer support 32 are labeled with three kinds of fluorescent dye, Fluorescein, Rhodamine B and Cy-5, it is possible to read images of the respective fluorescent dyes by only once moving the transfer support in the sub-scanning direction and exciting the fluorescent dye using a different laser stimulating ray source every scanning line.

More specifically, when the user inputs through the input means 51 an instruction signal requesting that the fluorescent images of Cy-5, Rhodamine B and Fluorescein be read in this order and that a different laser stimulating ray source be used for excitation every scanning line, the control unit 50 first outputs a drive signal to the motor 111 to rotate the disk 112 so that the triangular cone mirror 110 is positioned in the optical path of fluorescent light reflected by the mirror 101. The control unit 50 then activates the first laser stimulating ray source 61 and turns on the light modulator 4. As a result, a laser beam 3 having a wavelength of 633 nm is emitted from the first laser stimulating ray source 61 and passes through the light modulator 4 and the dichroic mirrors 64, 65. The laser beam 3 is then reflected by the mirror 66 and enters the optical head 80. The laser beam 3 impinging on the optical head 80 passes through the coating portion 101a of the mirror 101 and is converged by the convex lens 82 onto the surface of the transfer support 32. Since the optical head 80 is moved by the main scanning motor 93 in the main scanning direction indicated by X in FIG. 10, the transfer support 32 is scanned with the laser beam 3 having a wavelength of 633 nm by one scanning line. As a result, C-5 contained in the transfer support 32 is excited to release fluorescent light whose peak wavelength is 667 nm.

The fluorescent light released from Cy-5 contained in the transfer support 32 is transformed by the convex lens 82 to be parallel light, reflected by the mirror 101 and further reflected by the triangular cone mirror 110 in three directions. The fluorescent light reflected by the triangular cone mirror 110 is photoelectrically detected by the first photomultiplier 105, the second photomultiplier 106 and the third photomultiplier 107. Since the filter 120a cuts off light having a wavelength of 473 nm and transmits light having a wavelength longer than 473 nm, the first photomultiplier 105 receives only fluorescent light having a wavelength longer than 473 nm. Since the filter 120b cuts off light having a wavelength of 532 nm and transmits light having a wavelength longer than 532 nm, the second photomultiplier 106 receives only fluorescent light having a wavelength longer than 532 nm. Since the filter 120c cuts off light having a wavelength of 633 nm and transmits light having a wavelength longer than 633 nm, the third photomultiplier 107 receives only fluorescent light having a wavelength longer than 633 nm.

When an instruction signal requesting that an image of Cy-5 be read has been input through the input means 51, the control unit 50 forwards only the electrical signal produced by photoelectrically detecting by the third photomultiplier 107 to the transmission buffer 26 via the amplifier 23, the A/D converter 24 and the line buffer 25 and stores image data corresponding to one scanning line therein.

The control unit 50 then turns off the light modulator 4 to cut the laser beam 3 emitted from the first laser stimulating ray source 61 and outputs a drive signal to the motor 91 to move the optical unit 90 in the sub-scanning direction indicated by Y in FIG. 10 by one scanning line. When the control unit 50 further activates the third laser stimulating ray source 63, a laser beam 3 having a wavelength of 532 nm is emitted from the third laser stimulating ray source 63. The laser beam 3 is reflected by the dichroic mirror 64 and passes through the dichroic mirror 65. The laser beam 3 is then reflected by the mirror 66 and enters the optical head 80. The laser beam 3 entering the optical head 80 passes through the coating portion 101a of the mirror 101 and is converged by the convex lens 82 onto the surface of the transfer support 32. Since the optical head 80 is moved by the main scanning motor 93 in the main scanning direction indicated by X in FIG. 10, the transfer support 32 is scanned with the laser beam 3 having a wavelength of 532 nm by one scanning line. As a result, Rhodamine B contained in the transfer support 32 is excited to release fluorescent light whose peak wavelength is 605 nm.

The fluorescent light released from Rhodamine B contained in the transfer support 32 is transformed by the convex lens 82 to be parallel light, reflected by the mirror 101 and further reflected by the triangular cone mirror 110 in three directions.

When an instruction signal requesting that an image of Rhodamine B be read after reading an image of Cy-5 has been input through the input means 51, the control unit 50 forwards only the electrical signal produced by photoelectrically detecting by the second photomultiplier 106 to the transmission buffer 26 via the amplifier 23, the A/D converter 24 and the line buffer 25 and stores image data corresponding to one scanning line therein.

The control unit 50 further outputs a drive signal to the sub-scanning motor 91 to move the optical unit 90 in the sub-scanning direction indicated by Y in FIG. 10 by one scanning line and activates the second laser stimulating ray source 62. As a result, a laser beam 3 having a wavelength of 473 nm is emitted from the second laser stimulating ray source 62. The laser beam 3 is reflected by the dichroic mirror 65 and further reflected by the mirror 66 to enter the optical head 80. The laser beam 3 entering the optical head 80 passes through the coating portion 101a of the mirror 101 and is converged by the convex lens 82 onto the surface of the transfer support 32. Since the optical head 80 is moved by the main scanning motor 93 in the main scanning direction indicated by X in FIG. 10, the transfer support 32 is scanned with the laser beam 3 having a wavelength of 473 nm by one scanning line. As a result, Fluorescein contained in the transfer support 32 is excited to release fluorescent light whose peak wavelength is 530 nm. In this embodiment, since fluorescent dye is excited using the second laser stimulating ray source 62 for emitting the laser beam 3 having a wavelength of 473 nm, the strength of the stimulating ray is higher than that emitted from an LED and, therefore, it is possible to release a sufficient amount of fluorescent light from the fluorescent dye.

The fluorescent light released from Fluorescein contained in the transfer support 32 is transformed by the convex lens 82 to be parallel light, reflected by the mirror 101 and further reflected by the triangular cone mirror 110 in three directions.

When an instruction signal requesting that an image of Fluorescein is read after reading an image of Rhodamine B has been input through the input means 51, the control unit 50 forwards only the electrical signal produced by photoelectrically detecting by the first photomultiplier 105 to the transmission buffer 26 via the amplifier 23, the A/D converter 24 and the line buffer 25 and stores image data corresponding to one scanning line therein.

The fluorescent dye contained in the transfer support 32 is repeatedly excited, scanning line by scanning line, using laser stimulating ray sources in the order of the first laser stimulating ray source 61, the third laser stimulating ray source 63 and the second laser stimulating ray source 62 in this manner and image data are produced by detecting fluorescent light released upon excitation. The thus produced image data are output from the transmission buffer 26 to the image processing apparatus 27 and a visual image is displayed on the display means such as a CRT. The image displayed in this manner contains images of DNA labeled with Cy-5, Rhodamine B and Fluorescein every three scanning lines.

On the other hand, when a radiation image, an autoradiographic image, a radiographic diffraction image or an electron microscopic image of an object recorded in a stimulable phosphor layer 41 of the stimulable phosphor sheet 42 is read out, instead of the fluorescent image carrier unit 30, the stimulable phosphor sheet unit 40 shown in FIG. 2 is set in the image reading apparatus 28 and the stimulable phosphor sheet 42 formed with the stimulable phosphor layer 41 recording locational information regarding a radioactively labeled substance contained in a gene produced by the Southern blot hybridization method is scanned with a laser beam 3.

When an image is read from the stimulable phosphor sheet 42 recording locational information regarding a radioactively labeled substance in a specimen, the user inputs an instruction that the image carrier is a stimulable phosphor sheet 42. As a result, the control unit 50 outputs a drive signal to the motor 111 to rotate the disk 112 so that the hole 113 is positioned in an optical path of stimulated emission released from the stimulable phosphor layer 41 and reflected by the mirror 101. The control unit 50 then activates the first laser stimulating ray source 61 and turns on the light modulator 4. As a result, the surface of the stimulable phosphor layer 41 formed on the stimulable phosphor sheet 42 is scanned in the same manner as the transfer support 32 with a laser beam 3 having a wavelength of 633 nm and the stimulable phosphor contained in the stimulable phosphor layer 41 is excited by the laser beam 3 to release stimulated emission. The stimulated emission is transformed by the convex lens 82 to be parallel light and reflected by the mirror 101. The stimulated emission passes through the hole 113 of the disk 112 and light having a wavelength of 633 nm is cut off by the filter 120d disposed in front of the fourth photomultiplier 108. Therefore, only light of the wavelength region of the stimulated emission is photoelectrically detected by the fourth photomultiplier 108.

An electrical signal produced by photoelectrically detecting the stimulated emission is forwarded via the amplifier 23, the A/D converter 24, the line buffer 25 and the transmission buffer 26 to the image processing apparatus 27 as image data.

According to the above described embodiment, both the electrophoresis image of DNA labeled with fluorescent dye and recorded in the transfer support 32 and the electrophoresis image of DNA labeled with the radioactively labeled substance and recorded in the stimulable phosphor layer 41 formed on the stimulable phosphor sheet 42 can be read by a single image reading apparatus. The efficiency is therefore high. Further, in this embodiment, the laser beam 3 emitted from the first laser stimulating ray source 61, the second laser stimulating ray source 62 or the third laser stimulating ray source 63 passes through the coating portion 101a formed in the mirror 101 of the optical head 80 and is converged by the convex lens 82 onto the surface of the transfer support 32 or the stimulable phosphor layer 41. The surface of the transfer support 32 or the stimulable phosphor layer 41 is scanned with the laser beam 3 by moving the optical head 80 in both the main scanning direction and the sub-scanning direction, whereby fluorescent light or stimulated emission is released from the transfer support 32 or the stimulable phosphor layer 41. The fluorescent light or the stimulated emission is reflected by the mirror 101 in the direction opposite from the first laser stimulating ray source 61, the second laser stimulating ray source 62 and the third laser stimulating ray source 63 and photoelectrically detected by the first photomultiplier 105, second photomultiplier 106 and the third photomultiplier 107 or the fourth photomultiplier 108. Therefore, according to this embodiment, even if the second harmonic generation element capable of emitting a stimulating ray having high strength is used instead of an LED as the second laser stimulating ray source 62 or the third laser stimulating ray source 63, the surface of the transfer support 32 or the stimulable phosphor layer 41 can be scanned with the laser beam 3 with a simple structure and at high speed and, therefore, detection sensitivity can be markedly improved. Furthermore, since fluorescent dye contained in the transfer support 32 is excited using the first laser stimulating ray source 61 for emitting a laser beam 3 having a wavelength of 633 nm, the second laser stimulating ray source 62 for emitting a laser beam 3 having a wavelength of 473 nm and the third laser stimulating ray source 63 for emitting a laser beam 3 having a wavelength of 532 nm and a fluorescent image recorded in the transfer support 32 is read by a single image reading apparatus, it is possible to label a specimen with fluorescent dye excitable with a laser beam 3 having a wavelength of 633 nm, fluorescent dye excitable with a laser beam 3 having a wavelength of 532 nm and fluorescent dye excitable with a laser beam 3 having a wavelength of 473 nm and the utility of the fluorescence detecting system can be improved. Further, since the three photomultipliers 105, 106 and 107 for detecting fluorescent light are provided and the electrophoresis image of DNA fragments labeled with three kinds of fluorescent dye and recorded in the transfer support 32 can be read by a single sub-scanning operation, it is possible to efficiently read images of fluorescent dye. Moreover, when the kind of fluorescent dye is input through the input means 51, the control unit 50 selects the laser stimulating ray source suitable for exciting the specified fluorescent dye forming a fluorescent image to be read from among the first laser stimulating ray source 61, the second laser stimulating ray source 62 and the third laser stimulating ray source 63 and causes it to emit a laser beam 3, thereby reading a fluorescent image and only the electrical signal produced by the light detector suitable for detecting fluorescent light released from the specified fluorescent dye and selected from among the photomultipliers 105, 106 and 107 is used as image data. Or when an instruction that the image carrier is a stimulable phosphor sheet 42 is input through the input means 51, the control unit 50 selects the first laser stimulating ray source 61 suitable for exciting the stimulable phosphor and only an electrical signal produced by detecting stimulated emission released upon the excitation of the stimulable phosphor layer 41 with the laser beam 3 by the photomultiplier 108 is used as image data. Therefore, the operation is very simple and it is possible to eliminate the risk of erroneously activating the second laser stimulating ray source 62 or the third laser stimulating ray source 63 when a radiation image recorded in the stimulable phosphor layer 41 formed on the stimulable phosphor sheet 42 is to be read. It is therefore possible to eliminate the risk of such an error causing a part of radiation energy stored in the stimulable phosphor layer 41 to be released so that the radiation image cannot accurately be read or cannot be read at all as the case may be.

The present invention has thus been shown and described with reference to specific embodiments. However, it should be noted that the present invention is in no way limited to the details of the described arrangements but changes and modifications may be made without departing from the scope of the appended claims.

For example, in the above described embodiments, the electrophoresis image of gene obtained by Southern blot hybridization method is recorded in the transfer support 32 in accordance with a fluorescent detection system and is recorded in the stimulable phosphor layer 41 formed on the stimulable phosphor sheet 42 in accordance with the autoradiographic system and these images are photoelectrically read out. However, the present invention is not limited to such image reading but can also be applied to various other types of image reading. Specifically, the present invention can also be applied to reading of other images of fluorescent substances recorded in a gel support or a transfer support in accordance with the fluorescent detection system or images for the separation or identification of protein or the estimation of molecular weight or properties of protein or the like, autoradiographic images of a protein produced by thin layer chromatography (TLC) and recorded in the stimulable phosphor layer 41 formed on the stimulable phosphor sheet 42, an autoradiographic image produced by polyacrylamide gel electrophoresis for the separation or identification of protein or the estimation of molecular weight or properties of protein or the like and recorded in the stimulable phosphor layer 41 formed on the stimulable phosphor sheet 42, and an autoradiographic image recorded in the stimulable phosphor layer 41 formed on the stimulable phosphor sheet 42 for studying the metabolism, absorption, excretion path and state of a substance introduced into a test mouse. Further, the present invention is applicable to reading of an electron beam transmission image or an electron beam diffraction image of a metal or nonmetal produced by an electron microscope and an electron microscope image of tissue of an organism recorded in the stimulable phosphor layer 41 formed on the stimulable phosphor sheet 42, and a radiographic diffraction image of a metal or nonmetal recorded in the stimulable phosphor layer 41 formed on the stimulable phosphor sheet 42.

Further, in the above described embodiments shown in FIGS. 5, 7 and 10, although the image reading apparatus includes the third laser stimulating ray source 63, the third laser stimulating ray source 63 is not absolutely necessary.

Furthermore, in the above described embodiments, although the He-Ne laser is used as the first laser stimulating ray source 1, 61, a semiconductor laser diode may be employed instead of the He-Ne laser.

Moreover, in the above described embodiments, although the laser beam source for emitting a laser beam 3 having a wavelength of 473 nm is used as the second laser stimulating ray source 2, 62, a laser beam source for emitting a laser beam 3 having a wavelength of 470 nm to 480 nm may be used for the second laser stimulating ray source 2, 62.

Further, in the above described embodiments, although the second harmonic generation element is employed for the laser stimulating ray source 2, 62 for emitting a laser beam 3 having a wavelength of 473 nm and the laser stimulating ray source 63 for emitting a laser beam 3 having a wavelength of 532 nm, other laser sources may be employed therefor.

Furthermore, in the above described embodiment shown in FIGS. 5, 7 and 10, although the laser beam source for emitting a laser beam 3 having a wavelength of 532 nm is used as the second laser stimulating ray source 63, a laser beam source for emitting a laser beam 3 having a wavelength of 530 nm to 540 nm may be used for the second laser stimulating ray source 63.

Moreover, in the above described embodiments, although the light guide 20 made by processing a non-fluorescent glass or the like is employed, the light guide is not limited to one made of a non-fluorescent glass but a light guide made by processing synthesized crystal, a transparent sheet such as an acrylic synthetic resin sheet or the like may be used.

Further, in the above described embodiments, although the stimulable phosphor sheet unit 40 is provided with the support plate 43 made of aluminum, the material of the support plate is not limited to aluminum but the support plate 43 may be formed of other metals or plastics.

Furthermore, in the above described embodiments, although the gum-like magnetic sheet is adhered to the support plate 43, so long as the magnetic layer formed on the stimulable phosphor sheet 42 can be attracted by a magnetic force and the stimulable phosphor sheet 42 can be integrally fixed onto the support plate 43, other methods such as a method of embedding magnets into the support plate 43 can be employed instead of adhering the gum-like magnetic sheet onto the support plate 43.

Moreover, in the embodiment shown in FIG. 7, fluorescent dye is excited with the laser beam 3 having a wavelength of 532 nm and fluorescent light released from the fluorescent dye and having the peak wavelength of 605 nm is photoelectrically detected by the first photomultiplier 84. However, it is not necessary for the fluorescent light released from fluorescent dye excitable with the laser beam 3 having a wavelength of 532 nm to be photoelectrically detected by the first photomultiplier 84. In the case where the peak wavelength of the fluorescent light released from fluorescent dye excitable with the laser beam 3 having a wavelength of 532 nm is located on longer wavelength side, it may be photoelectrically detected by the second photomultiplier 85 and this is more advantageous.

Further, in the embodiment shown in FIG. 10, fluorescent dye contained in the transfer support 32 is excited using different laser stimulating ray sources every scanning line. However, fluorescent dye contained in the transfer support 32 can be excited using different laser stimulating ray sources every pixel or every several pixels and fluorescent dye contained in the transfer support 32 can be excited by an arbitrary method as occasion demands.

Furthermore, in the embodiments shown in FIGS. 5, 7 and 10, when a fluorescent image recorded in the transfer support 32 is read, the kind of fluorescent dye is input through the input means 51 and when a radiation image recorded in the stimulable phosphor layer 41 formed on the stimulable phosphor sheet 42 is read, an instruction that the image carrier is a stimulable phosphor sheet is input through the input means 51, whereby the control unit 50 in the embodiment shown in FIG. 5 automatically selects one of the laser stimulating ray sources 61, 62, 63 and one of the filters 72a, 72b, 72c, 72d, the control unit 50 in the embodiment shown in FIG. 7 automatically selects one of the laser stimulating ray sources 61, 62, 63, the first photomultiplier 84 or the second photomultiplier 85 and one of the filters 86a, 86b, 86c, 87a, 87b, and the control unit 50 in the embodiment shown in FIG. 10 automatically selects one of the laser stimulating ray sources 61, 62, 63, one of the first to fourth photomultipliers 105, 106, 107, 108 and the angle of rotation of the disk 112. However, the kinds of instruction signals for causing the control unit 50 to effect such automatic selection can be arbitrarily determined and it is not necessary to input the kinds of fluorescent dye or that the image carrier is a stimulable phosphor sheet.

Moreover, the laser beam 3 emitted from the first laser stimulating ray source 61, the second laser stimulating ray source 62 or the third laser stimulating ray source 63 passes through the hole 81a formed in the mirror 81 in the embodiment shown in FIG. 7 and passes through the coating portion 101a formed in the mirror 101 for transmitting a laser beam 3 in the embodiment shown in FIG. 10. The laser beam 3 in both embodiments is converged by the convex lens 82 onto the surface of the transfer support 32 or the stimulable phosphor layer 41 and fluorescent light released from the transfer support 32 or stimulated emission released from the stimulable phosphor layer 41 is reflected by the mirror 81 or 101 in the direction opposite from the first laser stimulating ray source 61, the second laser stimulating ray source 62 and the third laser stimulating ray source 63 and photoelectrically detected. However, it is sufficient to form a portion for transmitting a laser beam 3 in the mirror 81 or 101 by providing a total reflection coating on the mirror 81 or 101 except at a portion through which a laser beam 3 passes and the like but it is not necessary to form the hole in the mirror 81 or the coating portion 101a for transmitting a laser beam 3 in the mirror 101.

Further, in the embodiments shown in FIGS. 5, 7 and 10, although the image reading apparatus includes the light modulator 4 and it is preferable to provide the light modulator 4 in the case where the laser stimulating ray sources have to be frequently switched, for example, in the case where the transfer support 32 is scanned using different laser stimulating ray sources every scanning line. However, the light modulator 4 is not absolutely necessary in the case where the laser stimulating ray sources do not have to be frequently switched, for example, in the case where the whole surface of the transfer support 32 is scanned using one of the first laser stimulating ray source 61, the second laser stimulating ray source 62 and the third laser stimulating ray source 63 and then scanned using another laser stimulating ray source.

Furthermore, in the embodiment shown in FIG. 7, fluorescent light or stimulated emission is lead using the triangular prism 83 to the first photomultiplier 84 and the second photomultiplier 85 and the control unit 50 inputs only one of the electrical signals produced by the first photomultiplier 84 and the second photomultiplier 85 as image data. Instead of the triangular prism 83, however, it is possible to adopt a configuration provided with a rotatable mirror which can be selectively positioned in a first position where it leads fluorescent light or stimulated emission to the first photomultiplier 84 and in a second position where it leads fluorescent light or stimulated emission to the second photomultiplier 85, and wherein the control unit 50 rotates the mirror in accordance with the wavelength of fluorescent light or stimulated emission to be detected to locate it in the first position or the second position, thereby leading the fluorescent light or the stimulated emission to the first photomultiplier 84 or the second photomultiplier 85 and that an electrical signal produced by the first photomultiplier 84 or the second photomultiplier 85 is input as image data. This configuration is desirable because it enables the amount of detected fluorescent light or stimulated emission to be doubled.

According to the present invention, it is possible to provide an image reading apparatus which can be used for a radiation diagnosis system, an autoradiographic system, an electron microscope detecting system and a radiation diffraction image detecting system using a stimulable phosphor and a fluorescence detecting system and can read an image with high sensitivity.

We claim:

1. An image reading apparatus comprising a first laser stimulating ray source for emitting a laser beam having a wavelength of 633 nm or 635 nm, a second laser stimulating ray source for emitting a laser beam having a wavelength of 470 to 480 nm, a laser beam scanning means for scanning a laser beam, at least one light detecting means for photoelectrically detecting light released from an image carrier carrying an image, and at least one filter means disposed in front of the light detecting means and having a plurality of filters for transmitting light of different wavelengths.

2. An image reading apparatus in accordance with claim 1, wherein the image carrier to be scanned with the laser beam emitted from the first laser stimulating ray source is constituted by a carrier, wherein the image carrier carries an image formed from fluorescent substances, or a stimulable phosphor sheet containing a stimulable phosphor recording an image selected from the group consisting of a radiation image, an autoradiographic image, a radiographic diffraction image and an electron microscope image of an object, and the image carrier to be scanned with the laser beam emitted from the second laser stimulating ray source is constituted by a carrier, wherein the image carrier carries an image formed from fluorescent substances.

3. An image reading apparatus in accordance with claim 1 which further comprises control means capable of selectively switching the plurality of laser stimulating ray sources.

4. An image reading apparatus in accordance with claim 3, wherein the image reading apparatus further comprises control means capable of selectively switching the plurality of filters of the filter means.

5. An image reading apparatus comprising a first laser stimulating ray source for emitting a laser beam having a wavelength of 633 nm or 635 nm, a second laser stimulating ray source for emitting a laser beam having a wavelength of 470 to 480 nm, a laser beam scanning means for scanning a laser beam, at least one light detecting means for photoelectrically detecting light released from an image carrier carrying an image, and at least one filter means disposed in front of the light detecting means and having a plurality of filters for transmitting light of different wavelengths, wherein the image carrier to be scanned with the laser beam emitted from the first laser stimulating ray source is constituted by a carrier, wherein the image carrier carries an image formed from fluorescent substances, or a stimulable phosphor sheet containing a stimulable phosphor recording an image selected from the group consisting of a radiation image, an autoradiographic image, a radiographic diffraction image and an electron microscope image of an object, and the image carrier to be scanned with the laser beam emitted from the second laser stimulating ray source is constituted by a carrier, wherein the image carrier carries an image formed from fluorescent substances, which further comprises a third laser stimulating ray source for emitting a laser beam having a wavelength of 530 to 540 nm.

6. An image reading apparatus in accordance with claim 5, wherein the image carrier to be scanned with the laser beam emitted from the third laser stimulating ray source is constituted by a carrier, wherein the image carrier carries an image formed from fluorescent substances.

7. An image reading apparatus comprising a first laser stimulating ray source for emitting a laser beam having a wavelength of 633 nm or 635 nm, a second laser stimulating ray source for emitting a laser beam having a wavelength of 470 to 480 nm, a laser beam scanning means for scanning a laser beam, at least one light detecting means for photoelectrically detecting light released from an image carrier carrying an image, and at least one filter means disposed in front of the light detecting means and having a plurality of filters for transmitting light of different wavelengths, which further comprises a third laser stimulating ray source for emitting a laser beam having a wavelength of 530 to 540 nm.

8. An image reading apparatus in accordance with claim 7, wherein the image carrier to be scanned with the laser beam emitted from the third laser stimulating ray source is constituted by a carrier, wherein the image carrier carries an image formed from fluorescent substances.

9. An image reading apparatus comprising a first laser stimulating ray source for emitting a laser beam having a wavelength of 633 nm or 635 nm, a second laser stimulating ray source for emitting a laser beam having wavelength of 470 to 480 nm, a laser beam scanning means for scanning a laser beam, a plurality of light detecting means for photoelectrically detecting light released from an image carrier carrying an image, and filter means disposed in front of each of the light detecting means, each being adapted for selectively transmitting only light of a predetermined wavelength range.

10. An image reading apparatus in accordance with claim 9, wherein the image carrier to be scanned with the laser beam emitted from the first laser stimulating ray source is constituted by a carrier, wherein the image carrier carries an image formed from fluorescent substances, or a stimulable phosphor sheet containing a stimulable phosphor recording an image selected from the group consisting of a radiation image of an object, an autoradiographic image, a radiographic diffraction image and an electron microscope image, and the image carrier to be scanned with the laser beam emitted from the second laser stimulating ray source is constituted by a carrier, wherein the image carrier carries an image formed from fluorescent substances.

11. An image reading apparatus in accordance with claim 9 which further comprises control means capable of selectively switching the plurality of laser stimulating ray sources.

12. An image reading apparatus in accordance with claim 11 wherein the control means is constituted so as to be able to selectively switch the plurality of laser stimulating ray sources in accordance with the kinds of image carriers.

13. An image reading apparatus comprising a first laser stimulating ray source for emitting a laser beam having a wavelength of 633 nm or 635 nm, a second laser stimulating ray source for emitting a laser beam having a wavelength of 470 to 480 nm, a laser beam scanning means for scanning a laser beam, a plurality of light detecting means for photoelectrically detecting light released from an image carrier carrying an image, and filter means disposed in front of each of the light detecting means, each being adapted for selectively transmitting only light of a predetermined wavelength range, wherein the image carrier to be scanned with the laser beam emitted from the first laser stimulating ray source is constituted by a carrier, wherein the image carrier carries an image formed from fluorescent substances, or a stimulable phosphor sheet containing a stimulable phosphor recording an image selected from the group consisting of a radiation image of an object, an autoradiographic image, a radiographic diffraction image and an electron microscope image, and the image carrier to be scanned with the laser beam emitted from the second laser stimulating ray source is constituted by a carrier, wherein the image carrier carries an image formed from fluorescent substances, which further comprises a third laser stimulating ray source for emitting a laser beam having a wavelength of 530 to 540 nm.

14. An image reading apparatus in accordance with claim 13, wherein the image carrier to be scanned with the laser beam emitted from the third laser stimulating ray source is constituted by a carrier, wherein the image carrier carries an image formed from fluorescent substances.

15. An image reading apparatus comprising a first laser stimulating ray source for emitting a laser beam having a wavelength of 633 nm or 635 nm, a second laser stimulating ray source for emitting a laser beam having a wavelength of 470 to 480 nm, a laser beam scanning means for scanning a laser beam, a plurality of light detecting means for photoelectrically detecting light released from an image carrier carrying an image, and filter means disposed in front of each of the light detecting means, each being adapted for selectively transmitting only light of a predetermined wavelength range, which further comprises a third laser stimulating ray source for emitting a laser beam having a wavelength of 530 to 540 nm.

16. An image reading apparatus in accordance with claim 15, wherein the image carrier to be scanned with the laser beam emitted from the third laser stimulating ray source is constituted by a carrier, wherein the image carrier carries an image formed from fluorescent substances.

* * * * *